United States Patent
Miyamoto

(10) Patent No.: US 7,496,273 B2
(45) Date of Patent: Feb. 24, 2009

(54) DATA RECORDING APPARATUS AND DATA RECORDING METHOD

(75) Inventor: Toshihiro Miyamoto, Kanagawa (JP)

(73) Assignee: Canon Kabushiki Kaisha (JP)

( * ) Notice: Subject to any disclaimer, the term of this patent is extended or adjusted under 35 U.S.C. 154(b) by 949 days.

(21) Appl. No.: 10/864,042

(22) Filed: Jun. 9, 2004

(65) Prior Publication Data

US 2004/0246841 A1    Dec. 9, 2004

(30) Foreign Application Priority Data

Jun. 9, 2003    (JP) ............................. 2003-163641

(51) Int. Cl.
*H04N 5/76* (2006.01)
*H04N 5/225* (2006.01)

(52) U.S. Cl. ........................................ 386/46; 386/117

(58) Field of Classification Search ........... 386/95–125, 386/1, 45–46, 117, 126; 369/47, 53; 348/231
See application file for complete search history.

(56) References Cited

U.S. PATENT DOCUMENTS 6,804,300 B1 * 10/2004 Hoshino et al. ........... 375/240.1
7,015,959 B1 * 3/2006 Morita .................... 348/231.9
7,028,203 B2 * 4/2006 Nakai ........................ 713/340
7,202,885 B2 * 4/2007 Motohashi ............... 348/14.02

FOREIGN PATENT DOCUMENTS

JP    6-165011(A)    6/1994

* cited by examiner

*Primary Examiner*—Thai Tran
(74) *Attorney, Agent, or Firm*—Rossi, Kimms & McDowell LLP

(57) ABSTRACT

A data recording apparatus, which is capable of acquiring and recording data according to the residual capacity of the battery when the residual capacity is small. A recording operation is carried out such that acquired information data is temporarily written onto the memory and thereafter the information data is transferred to a recording medium to record the information data. The data recording speed of the recording medium is detected. The residual capacity of the battery is detected. The expected driving time period for which the data recording apparatus can be driven is detected, based on the detected residual capacity. The quantity of data recordable on the recording medium is calculated based on the detected data recording speed and the detected expected driving time period. The size of data to be written onto the memory is changed based on the detected recordable quantity of data.

15 Claims, 20 Drawing Sheets

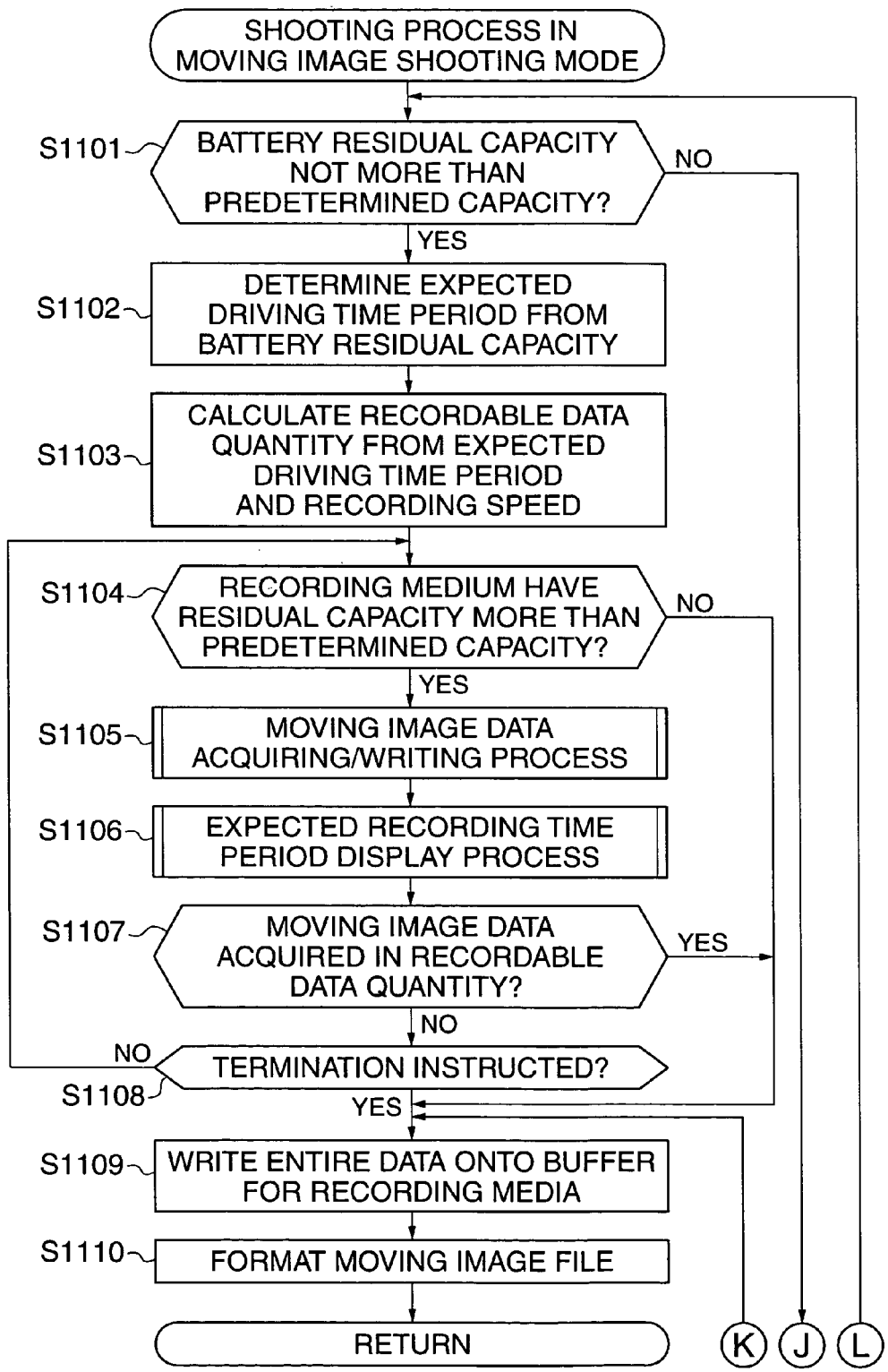

DATA RECORDING APPARATUS AND DATA RECORDING METHOD

BACKGROUND OF THE INVENTION

1. Field of the Invention

The present invention relates to a data recording apparatus and a data recording method, and more particularly relates to a data recording apparatus driven by a power supply having a limited driving time period such as a battery, and a data recording method applied to the data recording apparatus.

2. Description of the Related Art

Conventionally, there have been commercially available on the market data recording apparatuses such as an electronic camera which uses a memory card including a solid state memory device as a recording medium, and records video and audio on the recording medium. These data recording apparatuses temporarily stores still image data and moving image data acquired by an image pickup device and audio data acquired by an audio recording device on a volatile memory (write buffer), and then transfer these data to the recording medium.

If data which have not been transferred to the recording media still remain on the write buffer when the battery becomes empty, the data will be lost. To prevent this, conventionally the image pickup operation is not carried out until the battery becomes completely empty, but the data acquisition is terminated when the residual battery capacity decreases below a predetermined capacity (Japanese Laid-Open Patent Publication (Kokai) No. H06-165011, for example).

However, according to the conventional data recording apparatus, once the data acquisition is terminated, it is no longer possible to acquire data at all even if the battery capacity is still sufficient. Therefore, it has been desired that data can be acquired to the maximum possible extent without the already acquired data being lost when the battery capacity is still sufficient.

SUMMARY OF THE INVENTION

It is an object of the present invention to provide a data recording apparatus and a data recording method which are capable of acquiring and recording data according to the residual capacity of the battery when the residual capacity is small.

To attain the above object, in a first aspect of the present invention, there is provided a data recording apparatus comprising a memory, a controller that carries out a recording operation of temporarily writing acquired information data onto the memory, and thereafter transferring the information data to at least one recording medium to record the information data, a data recording speed detecting device that detects a data recording speed at which the information data is recorded on the recording medium, a power-supply remaining quantity detecting device that detects a remaining quantity of a power supply for supplying power to the data recording apparatus, an expected driving time period detecting device that detects an expected driving time period for which the data recording apparatus can be driven, based on the detected remaining quantity of the power supply, a recordable data quantity calculating device that calculates a quantity of data recordable on the recording medium based on the detected data recording speed and the detected expected driving time period, and a data size changing device that changes a size of data to be written onto the memory based on the detected recordable quantity of data.

Preferably, the data recording apparatus comprises an acquired data quantity detecting device that detects a quantity of the acquired information data, and a restriction device that restricts the recording operation of the data recording apparatus when the detected quantity of the acquired information data is larger than the changed size of data to be written onto the memory.

Preferably, the data recording speed detecting device acquires information relating to the data recording speed from information on specifications recorded on the recording medium and detects the data recording speed based on the acquired information relating to the data recording speed.

Preferably, the data recording speed detecting device comprises a writing device that writes a predetermined quantity of reference data onto the recording medium, and a timer that measures a time period required for writing the predetermined quantity of reference data onto the recording medium, and the data recording speed detecting device calculates the data recording speed based on the predetermined quantity of reference data and the measured time period.

Preferably, the controller causes the data recording speed detecting device to be operated immediately after start of the data recording apparatus.

Alternatively, the controller causes the data recording speed detecting device to be operated after recognition of the recording medium.

Also alternatively, the controller causes the data recording speed detecting device to be operated when a load on the data recording apparatus is less than a load in a predetermined state.

Preferably, the data recording speed detecting device comprises a storage circuit that stores speed information indicative of the data recording speed, and the data recording speed detecting device detects the data recording speed based on the speed information stored on the storage circuit.

More preferably, the data recording speed detecting device stores the speed information indicative of data recording speeds of a plurality of recording media in association with the plurality of recording media, and when the recording medium is one of the plurality of recording media, the data recording speed detecting device reads out the speed information corresponding to the recording medium from the storage circuit, and detects the data recording speed based on the read-out speed information.

Preferably, the data recording apparatus comprises an image pickup device that picks up a subject to obtain moving image data and outputs the moving image data, and wherein the moving image data obtained by the image pickup device is acquired as the information data.

To attain the above object, in a second aspect of the present invention, there is provided a data recording apparatus for recording information data on a recording medium, comprising a data recording speed detecting device that detects a data recording speed at which the information data is recorded on the recording medium, a power-supply remaining quantity detecting device that detects a remaining quantity of a power supply for supplying power to the data recording apparatus, an expected driving time period detecting device that detects an expected driving time period for which the data recording apparatus can be driven, based on the detected remaining quantity of the power supply, a recordable data quantity calculating device that calculates a quantity of data recordable on the recording medium based on the detected data recording speed and the detected expected driving time period, and a data size changing device that changes a quantity of the information data to be recorded on the recording medium based on the detected recordable quantity of data.

To attain the above object, in a third aspect of the present invention, there is provided a data recording method of causing a data recording apparatus to record acquired information data by temporarily writing acquired information data onto a memory, and thereafter transferring the information data to at least one recording medium, comprising a data recording speed detecting step of detecting a data recording speed at which the information data is recorded on the recording medium, a power-supply remaining quantity detecting step of detecting a remaining quantity of a power supply for supplying power to the data recording apparatus, an expected driving time period detecting step of detecting an expected driving time period for which the data recording apparatus can be driven, based on the detected remaining quantity of the power supply, a recordable data quantity calculating step of calculating a quantity of data recordable on the recording medium based on the detected data recording speed and the detected expected driving time period, and a data size changing step of changing a size of data to be written onto the memory based on the detected recordable quantity of data.

To attain the above object, in a fourth aspect of the present invention, there is provided a data recording method of causing a data recording apparatus to record information on a recording medium, comprising a data recording speed detecting step of detecting a data recording speed at which the information data is recorded on the recording medium, a power-supply remaining quantity detecting step of detecting a remaining quantity of a power supply for supplying power to the data recording apparatus, an expected driving time period detecting step of detecting an expected driving time period for which the data recording apparatus can be driven, based on the detected remaining quantity of the power supply, a recordable data quantity calculating step of calculating a quantity of data recordable on the recording medium based on the detected data recording speed and the detected expected driving time period, and a data size changing step of changing a quantity of the information data to be recorded on the recording medium based on the detected recordable quantity of data.

The above and other objects, features, and advantages of the invention will become more apparent from the following detailed description taken in conjunction with the accompanying drawings.

BRIEF DESCRIPTION OF THE DRAWINGS

FIGS. 18A and 18B are flowchart showing the procedure of a shooting process in the moving image shooting mode in the step S38.

DETAILED DESCRIPTION OF THE PREFERRED EMBODIMENTS

The present invention will now be described in detail with reference to the drawings showing a preferred embodiment thereof.

Figure 1:
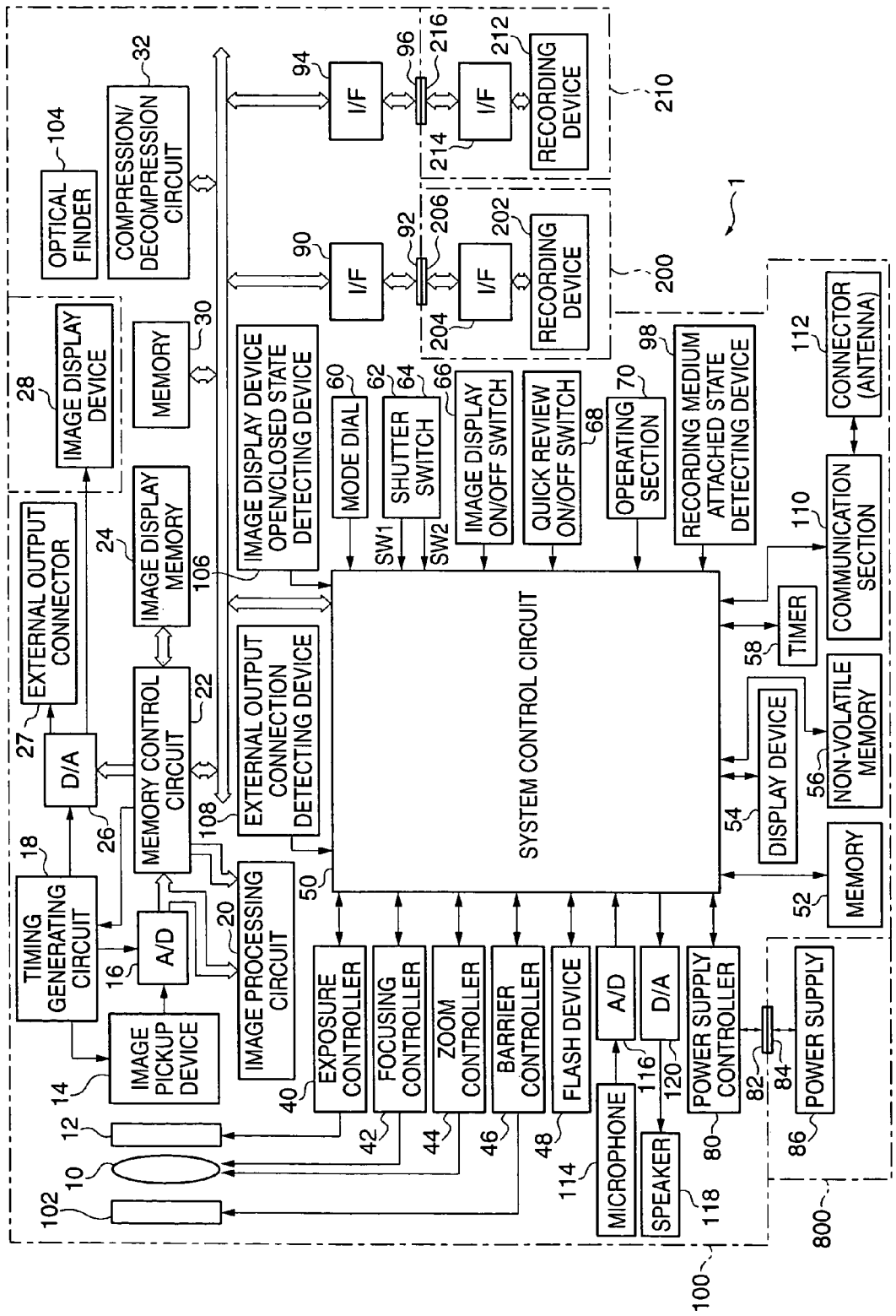
FIG. 1 is a block diagram showing the construction of an electronic camera as a data recording apparatus according to an embodiment of the present invention.
Figure 2:
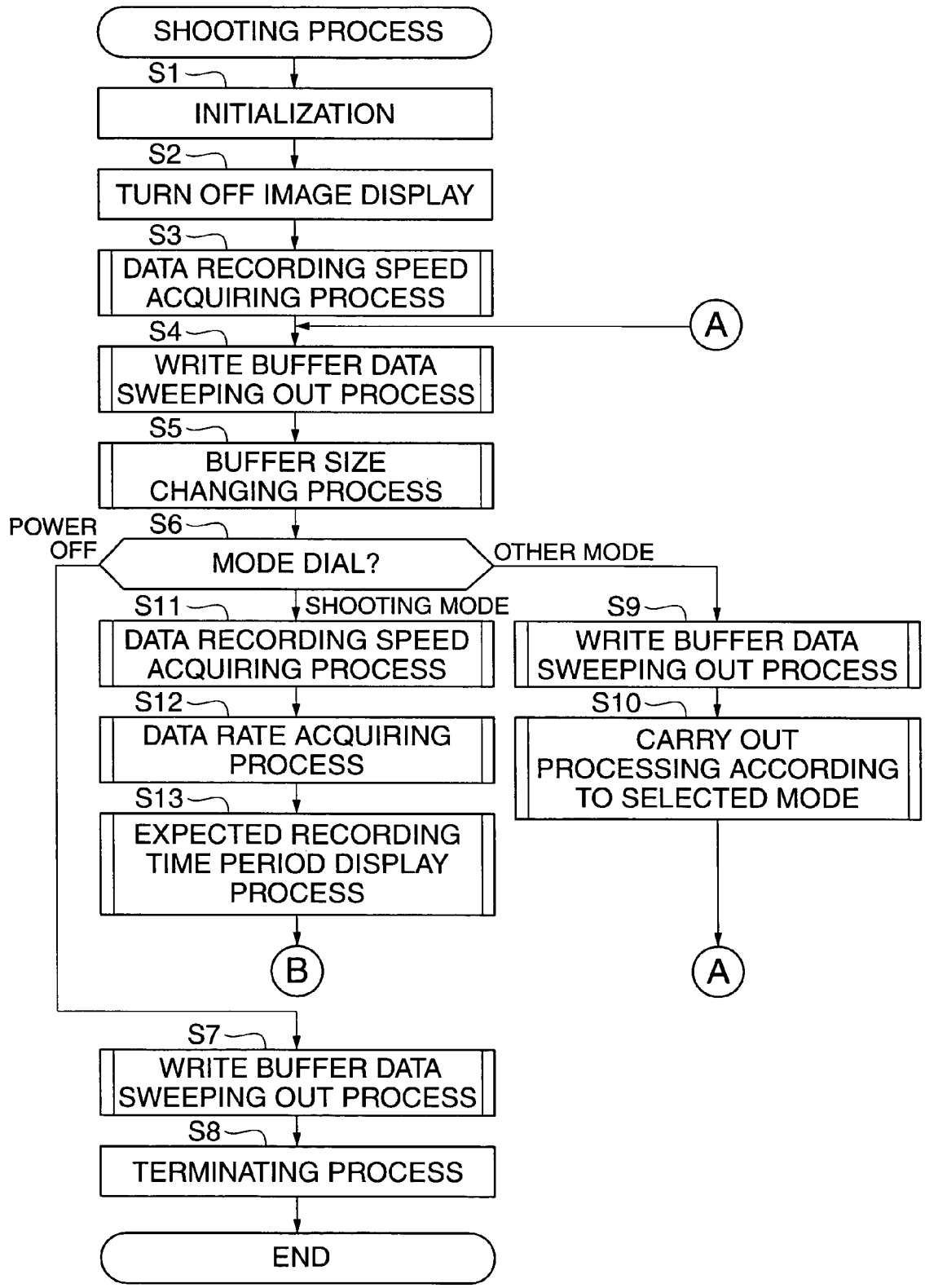
FIG. 2 is a flowchart showing the procedure of a shooting process carried out by an image processing apparatus 100 appearing in FIG. 1.
Figure 3:
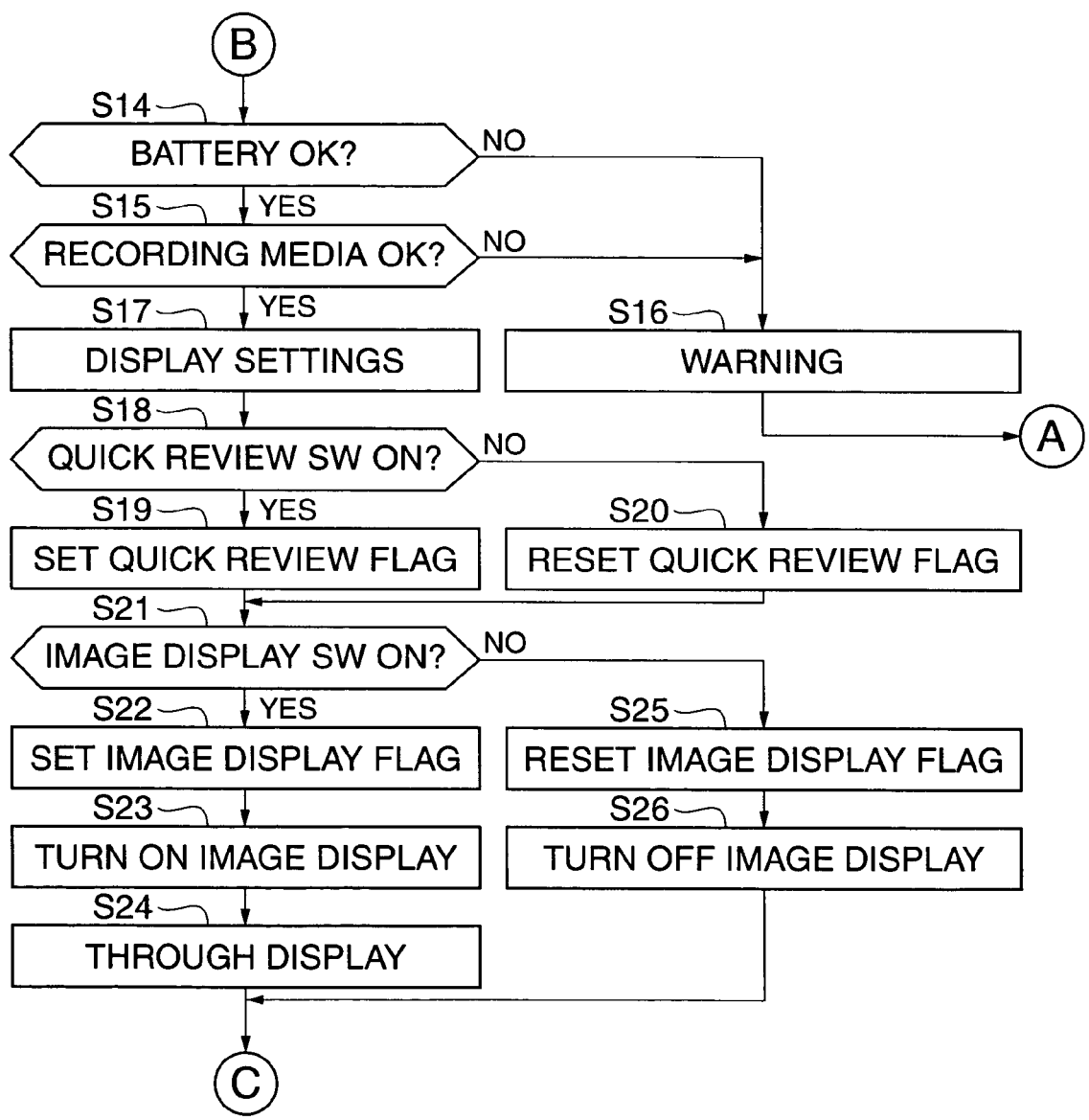
FIG. 3 is a flowchart showing a continued part of the flowchart of FIG. 2.
Figure 4:
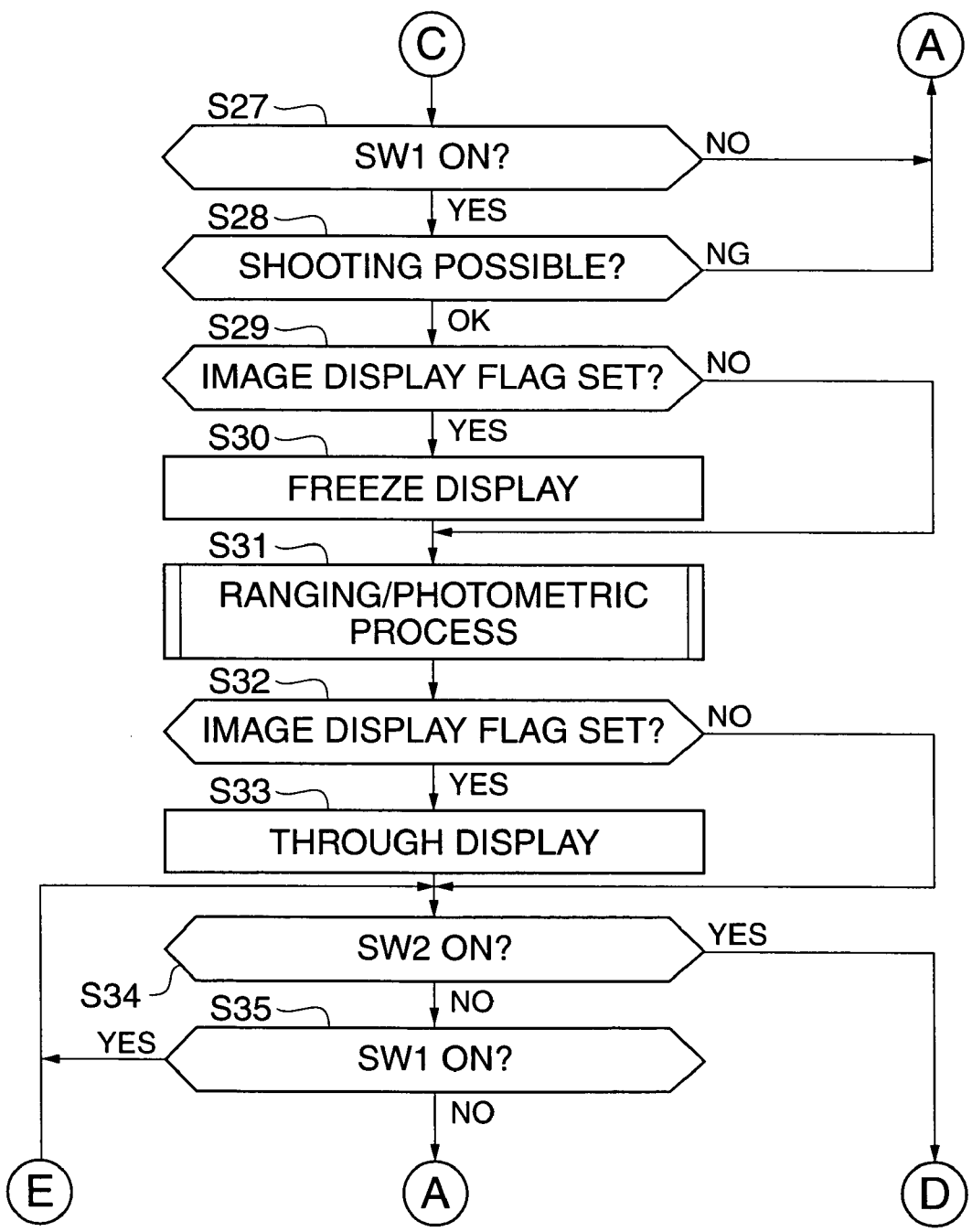
FIG. 4 is a flowchart showing a continued part of the flowchart of FIGS. 2 and 3.
Figure 5:
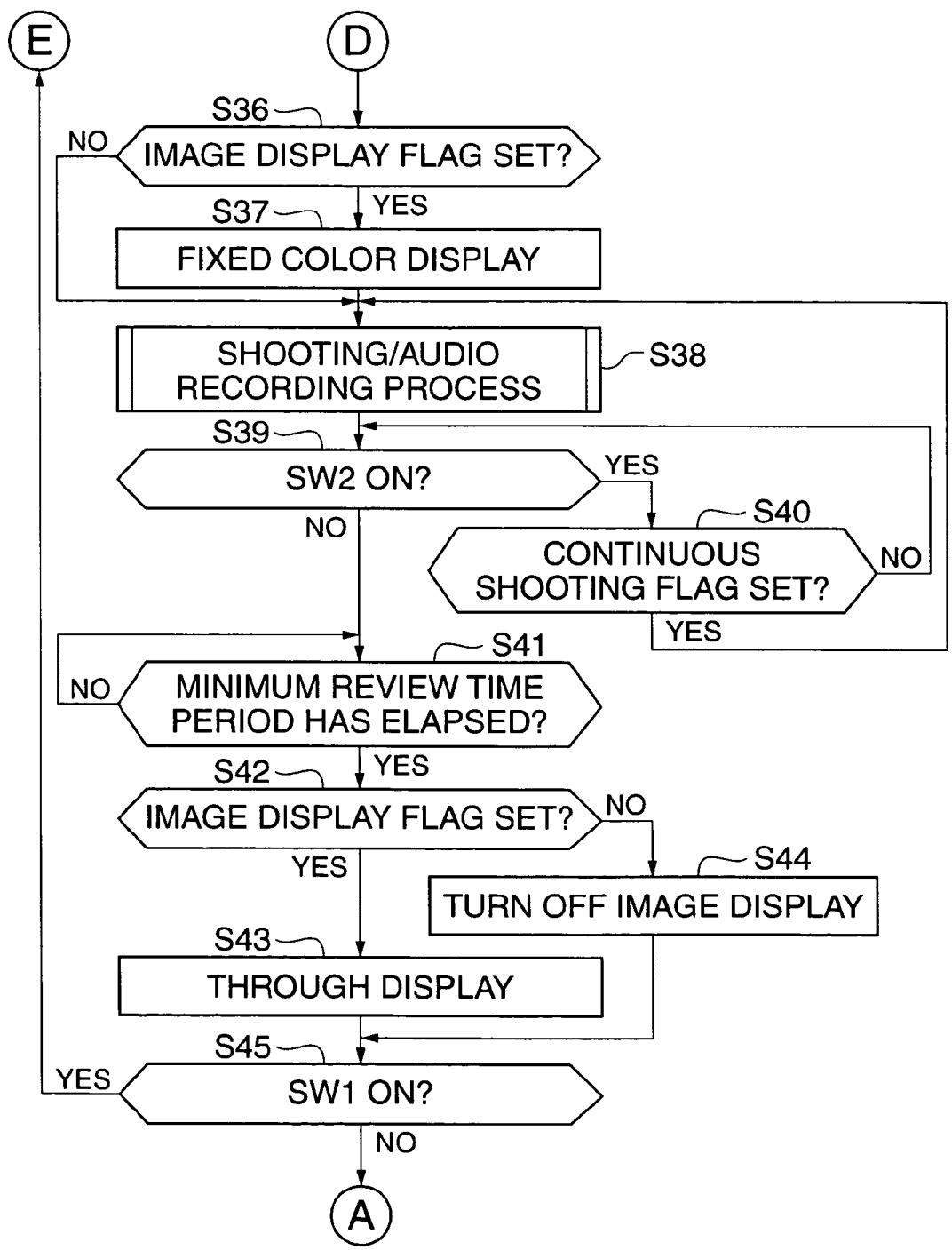
FIG. 5 is a flowchart showing a continued part of the flowchart of FIGS. 2, 3, and 4.

FIG. 1 is a block diagram showing the construction of an electronic camera as a data recording apparatus according to an embodiment of the present invention. As shown in FIG. 1, the electronic camera 1 is comprised of an image processing device 100, recording media 200 and 210, and a power supply device 800.

Reference numeral 14 denotes an image pickup device which converts an optical image to an electronic signal. Reference numeral 12 denotes a shutter having a diaphragm function which controls the exposure of the image pickup device 14.

Reference numeral 16 denotes an A/D converter which converts the analog signal output from the image pickup device 14 to a digital signal. Reference numeral 18 denotes a timing generating circuit which supplies a clock signal and control signals to the A/D converter 16 and a D/A converter 26, and is controlled by a memory control circuit 22 and a system control circuit 50.

Reference numeral 20 denotes an image processing circuit, and carries out predetermined pixel interpolation processing and color conversion processing upon data supplied from the A/D converter 16 and data supplied from the memory control circuit 22. The image processing circuit 20 carries out predetermined arithmetic processing using shot image data as required, and based on results of the arithmetic processing the system control circuit 50 carries out TTL (through-the-lens) AF (auto focus) processing, AE (auto exposure) processing, and EF (electronic flash control (preflash)) processing for controlling an exposure (shutter) controller 40 and a range controller 42. The image processing circuit 20 carries out predetermined arithmetic processing using the shot image data, and carries out TTL AWB (auto white balance) processing based-on results of the arithmetic processing.

The memory control circuit 22 controls the A/D converter 16, the timing generating circuit 18, the image processing circuit 20, an image display memory 24, the D/A converter 26, a memory 30, and a compression/decompression circuit 32.

The data output from the A/D converter 16 is written onto the image display memory 24 or the memory 30 via the image processing circuit 20 and the memory control circuit 22, or directly via the memory control circuit 22.

Reference numeral 27 denotes an external output connector which outputs an output signal from the D/A converter 26 to an external monitor. When a connector is connected to this external output connector 27, the system control circuit 50 can recognize that the output signal is in an externally output state, using an external output connection detecting device 108.

Reference numeral 28 denotes an image display device comprised of a TFT LCD. The image display device 28 displays the image data to be displayed written onto the image display memory 24 via the D/A converter 26. The shot image data can be sequentially displayed on the image display device 28, thus making it possible to realize an electronic finder function. Moreover, the image display device 28 can turn on/off the display according to instructions from the system control circuit 50. When the image display device 28 turns off the display, the power consumption of the image processing apparatus 100 can be largely reduced.

Further, the image display device 28 is rotatably connected to a main body of the image processing apparatus 100 via a hinge. The electronic finder function, a playback display function, and various other display functions can be provided by setting the image display device 28 in desired directions or at desired angles. Moreover, the image display device 28 can be retracted with its display facing toward the main body of the image processing apparatus 100. When the image display open/closed state detecting device 106 detects this retracted state, the image display device 28 stops its display operation.

The memory 30 stores shot still image data and moving image data, and has a storage capacity for storing data of a predetermined number of still images and a predetermined time period of moving images. Therefore, even in the case where a plurality of still images are sequentially shot in continuous shooting or panoramic shooting, data of a large number of images can be written onto the memory 30 at a high speed. Moreover, the memory 30 can be used as a work area for the system control circuit 50. The memory 30 is used as a write buffer for the recording media 200 and 210.

The compression/decompression circuit 32 compresses/decompresses image data using adaptive discrete cosine transform (ADCT) or the like. The compression/decompression circuit 32 compresses/decompresses image data read from the memory 30, and writes the compressed/decompressed data onto the memory 30.

The exposure controller 40 controls the shutter 12 having the diaphragm function, and cooperates with the flash device 48 to provide the flash control function. The range controller 42 controls focusing of a taking lens 10. Reference numeral 44 denotes a zoom controller which controls zooming of the taking lens 10.

Reference numeral 46 denotes a barrier controller which controls the operation of a protector 102 used as a barrier. The flash device 48 provides a light emitting function for emitting AF auxiliary light as well as the flash control function. The exposure controller 40 and the range controller 42 are controlled according to the TTL system. The system control circuit 50 controls the exposure controller 40 and the range controller 42 according to the processing result of the shot image data arithmetically processed by the image processing circuit 20.

The system control circuit 50 controls the entire image processing apparatus 100, and contains a well-known CPU and other component elements. Reference numeral 52 denotes a memory which stores constants, variables, and programs for operation of the system control circuit 50. Reference numeral 54 denotes a display device comprised of a liquid crystal display that displays operative states, messages, and others in terms of characters, images, and sounds according to execution of programs by the system control circuit 50, a speaker, and other component elements. The display device 54 is disposed at a single or a plurality of where the display device 54 can be easily viewed, i.e. a location or locations close to an operating section 70 of the image processing apparatus 100. The display device 54 is comprised of a combination of LCD's, LED's, and sound generating devices. A part of functions of the display device 54 are provided inside an optical finder 104.

Display contents displayed on the LCD of the display device 54 include single/continuous shooting, self-timer, compression ratio, recording pixel number, number of recorded shots, number of remaining shots, shutter speed, aperture, exposure compensation, flash, red-eye reduction, macro shooting, buzzer setting, clock battery residual capacity, battery residual capacity, error, information displayed in a plurality of digits, attachment/detachment of the recording media 200 and 210, communication I/F operation, and date and time.

Display contents of the display device 54 displayed in the optical finder 104 include focusing state, image vibration warning, flash charge, shutter speed, aperture, and exposure compensation.

Reference numeral 56 denotes a non-volatile memory which is electrically erasable/recordable, and stores programs, described later, and the like, and an EEPROM or the like is used as the non-volatile memory. Reference numeral 58 denotes a timer for measuring data recording speeds of the recording medium 200 and 210, and a data rate of the data to be acquired.

A mode dial switch 60, shutter switches 62 and 64, an image display ON/OFF switch 66, a quick review ON/OFF switch 68, and the operating section 70 are used to input various operation instructions for the system control circuit 50, and are each implemented by one or more combinations of switches, dials, touch panel, pointing using eye gaze direction detection, and speech recognition. A detailed description will now be given later.

The mode dial switch 60 can switch and set various functional shooting modes such as power-off, an automatic shooting mode, shooting modes (including a panoramic shooting mode, and a moving image shooting mode), a playback mode, a multi-screen playback/erase mode, and a PC connection mode.

The shutter switch (SW1) 62 turns on in the course of operation of a shutter button (not shown), to instruct start of the AF (auto focus) processing, the AE (auto exposure) processing, the AWB (auto white balance) processing, the EF (flash control (preflash)), and other processing.

The shutter switch (SW2) 64 turns on when the operation of the shutter button (not shown) is completed to instruct start of a sequence of processing including exposure processing for writing a signal read from the image pickup device 12 onto the memory 30 via the A/D converter 16 and the memory control circuit 22, development processing using arithmetic operations by the image processing circuit 20 and the memory control circuit 22, and recording processing for reading image data from the memory 30, compressing the image data by the compression/decompression circuit 32, and writing the resulting image data onto the recording media 200 and 210.

The image display ON/OFF switch 66 can cause the image display device 28 to turn on/off. This function of turning on/off the image display device 28 shuts off supply of current to the image display device 28 comprised of a TFT LCD or the like when shooting is carried out using the optical finder 104, to thereby save electric power.

The quick review ON/OFF switch 68 enables a quick review function for automatically playing back shot image data immediately after shooting thereof. It should be noted that the present embodiment has a function of enabling the quick review function when the image display device 28 is turned off.

The operating section 70 is comprised of various types of buttons and a touch panel. The buttons include a menu button, a set button, a macro button, a multi-screen-playback/page change button, flash set button, single shooting/continuous shooting/self-timer switching button, a menu change−(minus) button, a menu change+(plus) button, a playback image change+(plus) button, a playback image change−(minus) button, a shooting image quality selecting button, an exposure compensation button, a date/time set button, and other buttons.

A power supply controller 80 is comprised of a battery detecting circuit, a DC-DC converter, a switch circuit which switches blocks to be supplied with power, and other components, detects installation of a battery, the type of the battery, and the residual capacity of the battery, and controls the DC-DC converter based on the detection results and according to instructions of the system control circuit 50, to supply power of required voltage to various parts including the recording media 200 and 210.

In the power supply device 800, reference numeral 84 denotes a connector for connection to the connector 82 of the image processing apparatus 100, and reference numeral 86 denotes a power supply unit implemented by a primary battery such as an alkaline battery and a lithium battery, a secondary battery such as a NiCd battery, a NiMH battery and a Li battery, or an AC adapter.

Reference numerals 90 and 94 denote interfaces with recording media such as a memory card and a hard disk; 92 and 96, connectors for connection to the recording media 200 and 210 implemented by a memory card or a hard disk; and 98, a recording media mount/dismount detecting device that detects whether or not the recording media 200 and 210 are mounted on the connectors 92 and 96.

Although in the present embodiment there are provided two systems of the interface and connector for mounting the recording media 200 and 210, respectively, there may be provided a single or a desired umber of systems of the interface and connector for mounting the recording media 200 and 210. Interfaces and connectors that comply with the standards of the PCMCIA card and the CF (compact flash (registered trademark)) card may be used as these interfaces and connectors.

If the interfaces 90 and 94 and the connectors 92 and 96 are implemented by those complying with the standards of the PCMCIA card and the CF card, various types of communication cards such as a LAN card, a modem card, a USB card, an IEEE 1394 card, a P1284 card, a SCSI card, and a communication card for PHS may be connected for transmitting and receiving image data and control information relating to the image data to and from other computers and peripheral devices such as printers.

The protector 102 is used as a barrier which covers the image pickup device including the taking lens 10 of the image processing apparatus 100, to thereby prevent the image pickup device from being contaminated or damaged. The optical finder 104 alone can be used for shooting without using the electronic finder function provided by the image display device 28. Moreover, the optical finder 104 is provided with a part of the functions of the display device 54, such as focusing state, image vibration warning, flash charge, shutter speed, aperture, and exposure compensation.

The image display open/closed state detecting device 106 detects whether or not the image display device 28 is retracted with its display device facing toward the main body of the image processing apparatus 100. If the image display device open/closed state detecting device 106 detects that the image display device 28 is in the retracted state, the image display device 28 is caused to stop its display operation, whereby unnecessary power consumption is prevented.

The external output connection detecting device 108 detects whether or not an external monitor is connected to the external output connector 27. If the connection state is detected, the external monitor can be used as a display device in place of the image display device 28.

Reference numeral 110 denotes a communication section, and provides different types of communication functions such as RS232C, USB, IEEE1394, P1284, SCSI, modem, LAN, and wireless communication. Reference numeral 112 denotes a connector for connecting the image processing apparatus 100 with other apparatuses via the communication section 110, or an antenna for wireless communication with other apparatuses.

Reference numeral 114 denotes a microphone as an audio data acquiring means. Reference numeral 118 denotes a speaker as an audio data playback means. Reference numeral 120 denotes a D/A converter that performs digital to analog conversion to reproduce digital audio data output from the system control circuit 50 on the speaker 118.

The recording medium 200 is a memory card, a hard disk, or the like, and is comprised of a recording section 202 implemented by a semiconductor memory, a hard disk, or the like, an interface 204 that provides interface with the image processing apparatus 100, and a connector 206 connected to either the connector 92 or the connector 96 of the image processing apparatus 100. If the recording medium 200 is a PC card according to the PCMCIA Standards, a compact flash (registered trademark), or the like, the recording medium 200 may contain an information storage circuit which stores specifications such as a data recording speed and the like.

The recording medium 210, like the recording medium 200, is a memory card, a hard disk, or the like, and is comprised of a recording section 212 implemented by a semiconductor memory, a hard disk, or the like, an interface 214 that provides interface with the image processing apparatus 100, and a connector 216 connected to either the connector 92 or the connector 96 of the image processing apparatus 100. If the recording medium 210 is a PC card according to the PCMCIA Standards, a compact flash (registered trademark), or the like, the recording medium 200 may contain an information storage circuit which stores specifications such as a data recording speed.

A description will now be given of the operation of the electronic camera 1 constructed as above. FIGS. 2, 3, 4, and 5 are flowcharts showing the procedure of a shooting process carried out by the image processing apparatus 100. A program for executing this process is stored on a ROM, not shown, of the system control circuit 50, and is executed by the CPU, not shown, of the system control circuit 50.

If the power supply is turned on after replacement of the battery, or by an operation of the mode dial switch 60 or the like, the system control circuit 50 initializes flags, control variables, etc. (step S1), and sets the image display of the image display device 28 to an off state which is an initial state (step S2). Then, a data recording speed acquiring process is carried out to acquire respective data recording speeds of the recording media 200 and 210 (step S3). It should be noted that the acquisition of the data recording speeds in the step S3 may be carried out immediately after the power supply is turned on, after the recording media 200 and 210 are recognized, or when a load on the electronic camera 1 is low as described later (refer to steps S7 through S9). A detailed description will be given of this data recording speed acquiring process later with reference to FIG. 12.

The system control circuit 50 carries out a write buffer data sweeping out process to check the write buffer for the recording media 200 and 210 allocated to the memory 30. If there remain data which have not been transferred yet, the system control circuit 50 writes respective predetermined quantities of data onto the recording media 200 and 210 (step S4), and carries out a buffer size changing process to calculate a recordable data quantity, thereby changing the write buffer size (step S5).

Then, the system control circuit 50 determines the set position of the mode dial 60 (step S6). If it is determined that the mode dial 60 is set to the power-off position, the write buffer sweeping out process is carried out to write the entire remaining data, which are stored on the write buffer provided for the recording media 200 and 210 allocated to the memory 30, onto the recording media 200 and 210 (step S7). Then, a terminating process is carried out (step S8), to terminate the present process. In the terminating process, the displays of the respective display devices are terminated, and the protector 102 as the barrier is closed to protect the image pickup device. Further, in the terminating process, necessary parameters such as flags and control variables, set values, a set mode, the respective data recording speeds of the recording media 200 and 210, acquired data rates for respective operation modes, and the like are stored on the non-volatile memory 56, and the power supply controller 80 is caused to shut down unnecessary power supplies to respective devices and sections of the image processing apparatus 100 including the image display device 28.

If it is determined in the step S6 that the mode dial 60 is set to another mode, the write buffer data sweeping out process is carried out to cause the system control circuit 50 to write the entire remaining data, which are stored on the write buffer for the recording media 200 and 210 allocated to the memory 30, on the recording media 200 and 210 (step S9). Then, processing is carried out according to the selected mode (step S10). Then, the process returns to the step S4.

If it is determined in the step S6 that the mode dial 60 is set to the shooting mode, the data recording speed acquiring process is carried out to cause the system control circuit 50 to acquire the respective data recording speeds of the recording media 200 and 210 (step S11).

If the set shooting mode is the moving image shooting mode, a data rate acquiring process is carried out to acquire the data rate of moving image data. On the other hand, the set shooting mode is an audio recording mode, the data rate acquiring process is carried out to acquire a data rate of audio data (step S12). Then, in either of the moving image mode or the audio recording mode, an expected recording time period display process is carried out to show an expected recording time period (step S13). It should be noted that the measurement of the respective data recording speeds of the recording media 200 and 210 need not be carried out in the step S11 if the measurement was carried out in the initialization step S1. If the measurement of the data recording speeds is carried out when the load on the electronic camera 1 is low, for example where the steps S11 through S13 are carried out, it is only necessary to carry out the measurement once, and is not necessary to repeatedly carry out the measurement.

Details of the write buffer data sweeping out process in the steps S4, S7, and S9 will be described later. Also, details of the buffer size changing process in the step S5 will be described later. Further, details of the data recording speed acquiring process in the step S11 will be described later. Still further, details of the data rate acquiring process in the step S12 and the expected recording time period display process in the step S13 will be described later.

After the process in the step S13 is carried out, the system control circuit 50 causes the power supply controller 80 to determine whether or not the power supply unit 86 such as a battery has such a problem that the residual capacity of the battery and the operative state of the power supply unit 86 influence the operation of the image processing apparatus 100 (step S14). If the power supply unit 86 has such a problem as the influence on the operation of the image processing apparatus 100, a predetermined warning is given on the display device 54 (step S16), and the process returns to the step S4.

On the other hand, if it is determined in the step S14 that the power supply unit 86 does not have any problem, it is determined whether or not the recording media 200 and 210 have such a problem that the operative states of the recording media 200 and 210 influence the operation of the image processing apparatus 100, especially operations of recording and playing back image data on the recording media 200 and 210, for example (step S15). If it is determined in the step S16 that the recording media 200 and 210 have no problem, a predetermined warning is given on the display device 54, and the process returns to the step S4.

On the other hand, if it is determined in the step S15 that the recording media 200 and 210 do not have any problem, various settings of the image processing apparatus 100 are displayed on the display device 54 (step S17). If the image display of the image display device 28 is set ON, the various settings of the image processing apparatus 100 are also displayed on the image display device 28 as well.

The system control circuit 50 determines the set state of the quick review ON/OFF switch 68 (step S18). If it is determined that the quick review is set ON, a quick review flag is set (step S19), and the process proceeds to a step S21. On the other hand, if it is determined that the quick review is set OFF, the quick review flag is reset (step S20), and the process proceeds to the step S21. It should be noted that the state of the quick review flag is stored on an internal memory, not shown, of the system control circuit 50, or on the memory 52.

Then, the system control circuit 50 determines the set state of the image display ON/OFF switch 66 (step S21). If it is determined that the image display is set ON, an image display flag is set (step S22), and the image display of the image display device 28 is set ON (step S23). Then, the image display of the image display device 28 is set to a through display state where shot images are sequentially displayed (step S24). Then, the process proceeds to a step S27. In the through display state, data picked up by the image pickup device 14 and written onto the image display memory 24 via the A/D converter 16, the image processing circuit 20, and the memory control circuit 22 are sequentially displayed on the image display device 28 via the memory control circuit 22 and the D/A converter 26, thereby realizing the electronic finder function.

If it is determined in the step S21 that the image display ON/OFF switch 66 is set to turn off the image display, the image display flag is reset (step S25), and the image display of the image display device 28 is set OFF (step S26). Then, the process proceeds to the step S27. If it is determined that the image display is set OFF, the electronic finder function using the image display device 28 is not used, and shooting is carried out using the optical finder 104. In this case, it is possible to save the power consumption of the image display device 28, the D/A converter 26, and other components which consume a large amount of electric power. It should be noted that the state of the image display flag is stored on an internal memory, not shown, of the system control circuit 50, or on the memory 52.

Then, it is determined whether or not the shutter switch SW1 is pressed (step S27). If it is determined that the shutter switch SW1 is not pressed, the process returns to the step S4. On the other hand, if it is determined in the step S27 that the shutter switch SW1 is pressed, it is determined whether or not shooting is possible, specifically, the write buffer on the memory 30 has a free space larger than a capacity corresponding to a data quantity to be acquired under present shooting conditions (step S28). If it is determined that the write buffer on the memory 30 has a free space less than the capacity corresponding to the data quantity to be acquired under the present shooting conditions, the process returns to the step S4.

On the other hand, if it is determined in the step 28 that the free space of the write buffer on the memory 30 is not less than the capacity corresponding to the data quantity to be acquired under the present shooting conditions, the system control circuit 50 determines the state of the image display flag stored on the internal memory of the system control circuit 50 or on the memory 52 (step S29). If it is determined that the image display flag is set, the display state of the image display device 28 is set to a freeze display state (step S30). In this freeze display state, rewrite of image data on the image display memory 24 via the image pickup device 12, the A/D converter 16, the image processing circuit 20, and the memory control circuit 22 is inhibited, and image data written last is displayed on the image display device 28 via the memory control circuit 22 and the D/A converter 26, whereby a frozen image is displayed on the electronic finder. On the other hand, if it is determined in the step S29 that the image display flag is reset, the process jumps to a step S31.

The system control circuit 50 carries out a ranging process so as to focus the taking lens 10 on a subject, and at the same time, carries out a photometric process so as to determine an aperture and a shutter speed (step S31). This photometric process sets the flash if necessary. The ranging/photometric processes in the step S31 will be detailed in detail later.

After the ranging/photometric processes are carried out, the system control circuit 50 determines the state of the image display flag stored on the internal memory of the system control circuit 50 or on the memory 52 (step S32). If it is determined that the image display flag is set, the display state of the image display device 28 is set to a through display state (step S33). The through display state in the step S33 is the same as the through display state in the step S24. On the other hand, if it is determined that the image display flag is reset, the process jumps to a step S34.

Then, it is determined whether or not the shutter switch SW2 is pressed (step S34). If it is determined that the shutter switch SW2 is not pressed, it is determined whether or not the shutter switch SW1 is pressed (step S35). If it is determined that the shutter switch SW2 is not pressed, and the shutter switch SW1 is released, the process returns to the step S4. If it is determined that the shutter switch SW2 is not pressed, but the shutter switch SW1 is pressed, the process returns to the step S34.

If it is determined in the step S34 that the switch SW2 is pressed, the system control circuit 50 determines the state of the image display flag stored on the internal memory of the system control circuit 50 or on the memory 52 (step S36). If it is determined that the image display flag is set, the display state of the image display device 28 is set to a fixed color display state (step S37). In this fixed color display state, in place of image data picked up by the image pickup device 12 and written onto the image display memory 24 via the A/D converter 16, the image processing circuit 20, and the memory control circuit 22, fixed color mage data are displayed by the image display device 28 via the memory control circuit 22 and the D/A converter 26, thereby displaying an image in fixed colors on the electronic finder. On the other hand, if it is determined in the step S36 that the image display flag is reset, the process jumps to a step S38.

Then, the system control circuit 50 carries out a shooting process comprised of exposure processing for writing image data picked up by the image pickup device 12 onto the memory 30 via the A/D converter 16, the image processing circuit 20, and the memory control circuit 22, or via the memory control circuit 22 directly after A/d conversion by the A/D converter 16, and development processing for causing the memory control circuit 22, and the image processing circuit 20 if necessary, to read the image data written onto the memory 30, and carrying out various processing on the read image data. Then, the system control circuit 50 carries out a recording process to record the image data on the write buffer for the recording media 200 and 210 on the memory 30 (step S38). Details of the shooting and recording processes for the respective shooting modes will be described later.

When the shooting and recording processes are completed, it is determined whether or not the shutter switch SW2 is pressed (step S39). If it is determined that the switch SW2 is pressed, the system control circuit 50 determines the state of a continuous shooting flag stored on an internal memory, not shown, of the system control circuit 50 or on the memory 52 (step S40). If it is determined that the continuous shooting flag is set, the process returns to the step S38 for continuous shooting, where shooting is further carried out. On the other hand, if it is determined in the step S40 that the continuous shooting flag is not set, the steps S39 and S40 are repeatedly executed until the shutter button SW2 is released ("NO" to the step S39).

If the shutter switch SW2 is released when the shooting and recording processes in the step S38 is completed, or if the shutter switch SW2 is released after the shutter switch SW2 remains pressed to continue the quick review display so as to review shot images ("NO" to the step S39), it is waited for a predetermined minimum preview time period to elapse (step S41).

If the minimum preview time period has elapsed in the step S41, the system control circuit 50 determines whether or not the image display flag is set (step S42). If it is determined that the image display flag is set, the display state of the image display device 28 is set to the through display state (step S43). In this case, after the shot images are reviewed using the quick review display of the image display device 28, the display state is set to the through display state to sequentially display shot image data for the next shooting.

On the other hand, if it is determined in the step S42 that the image display flag is reset, the image display of the image display device 28 is set OFF (step S44). In this case, after the shot images are reviewed using the quick review display of the image display device 28, the operation of the image display device 28 is stopped to save the electric power, to thereby reduce power consumption by the image display device 28, the D/A converter 26, and other components which consume a large amount of electric power.

Then, it is determined whether or not the shutter switch SW1 is pressed (step S45). If it is determined that the shutter switch SW1 is pressed, the process returns to the step S34 to prepare for the next shooting. On the other hand, if it is determined that the shutter switch SW1 is released, the sequence of shooting operations is terminated, and the process returns to the step S4.

Figure 6:
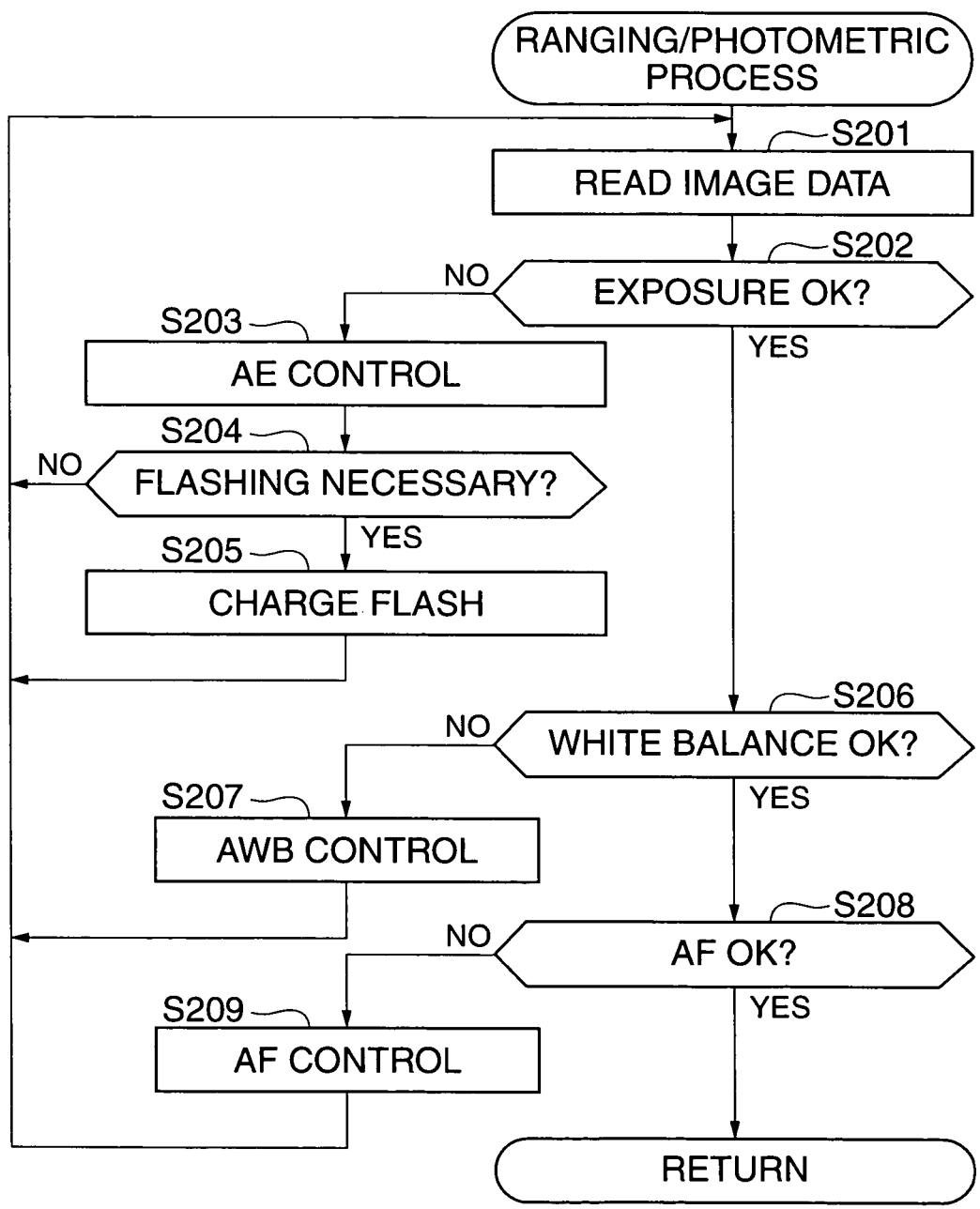
FIG. 6 is a flowchart showing the procedure of a ranging/photometric process in a step S31 appearing in FIG. 4.

FIG. 6 is a flowchart showing the procedure of the ranging/photometric process in the step S31. In FIG. 6, the system control circuit 50 reads out a charge signal from the image pickup device 14, and sequentially reads the shot image data into the image processing circuit 20 via the A/D converter 16 (step S201). Using the sequentially read image data, the image processing circuit 20 carries out predetermined arithmetic operations for the TTL (through the lens) AE (auto exposure) processing, the EF (preflash) processing, and the AF (auto focus) processing.

In these processing, only specific necessary parts of all the pixels of the picked up image data are selectively extracted and used for the arithmetic operations. As a result, in each of the TTL AE, EF, AWB, and AF processing, optimal arithmetic operations are carried out for respective different modes such as a center-weighted metering mode, average metering mode, evaluation mode.

Using results of the arithmetic operations by the image processing circuit 20, the system control circuit 50 determines whether or not the exposure (AE) is proper (step S202). If it is determined that the exposure is not proper, the exposure controller 40 carries out AE control (step S203). The system control circuit 50 uses measured data acquired in the AE control to determine whether or not flashing is necessary (step S204). If it is determined that flashing is not necessary, the process returns to the step S201. On the other hand, if it is determined that flashing is necessary, a flash flag is set, and the flash device 48 is charged (step S205). Then, the process returns to the step S201.

On the other hand, if it is determined in the step S202 that the exposure (AE) is proper, the system control circuit 50 stores the measured data and/or setting parameters on an internal memory, not shown, of the system control circuit 50 or on the memory 52, and uses the results of the arithmetic operations by the image processing circuit 20, and the measured data acquired by the AE control to determine whether or not the white balance (AWB) is proper (step S206).

If it is determined that the white balance is not proper, the image processing circuit 20 is caused to adjust parameters for color processing and carry out the AWB control (step S207). Then, the process returns to the step S201. On the other hand, if it is determined that the white balance (AWB) is proper, the system control circuit 50 stores the measured data and/or setting parameters on the internal memory of the system control circuit 50 or on the memory 52, and uses the measured data acquired by the AE control and the AWB control to determine whether or not the AF (auto focus) is proper or not, namely the subject is in focus (step S208). If it is determined that the subject is not in focus, the range controller 42 carries out the AF control until the subject is brought into focus (step S209).

On the other hand, if it is determined in the step S208 that the subject is in focus, the measured data and/or the setting parameters are stored in the internal memory of the system control circuit 50 or on the memory 52, and the present process is terminated.

Figure 7:
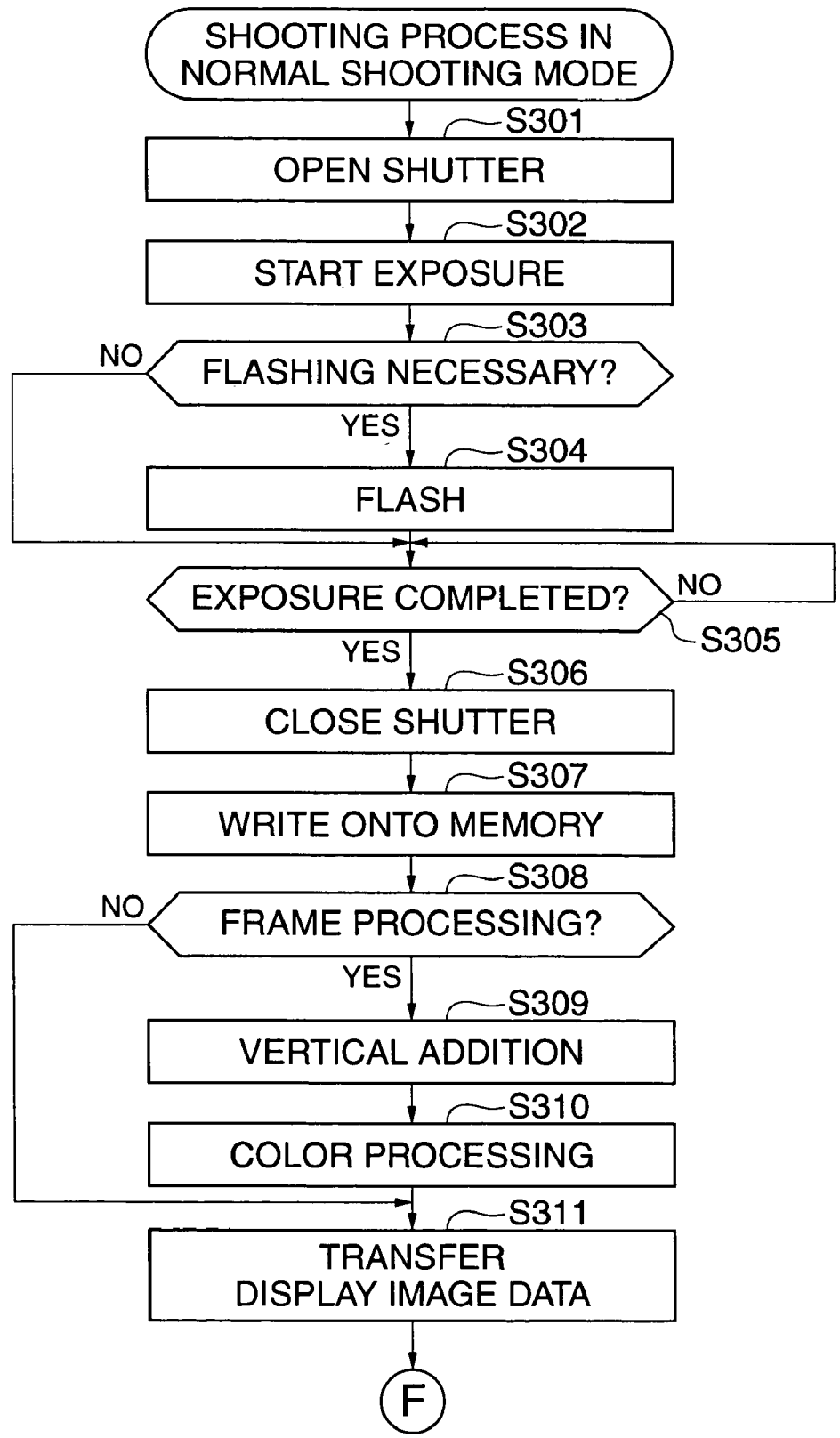
FIG. 7 is a flowchart showing the procedure of a shooting process in a normal shooting mode in a step S38 appearing in FIG. 5.
Figure 8:
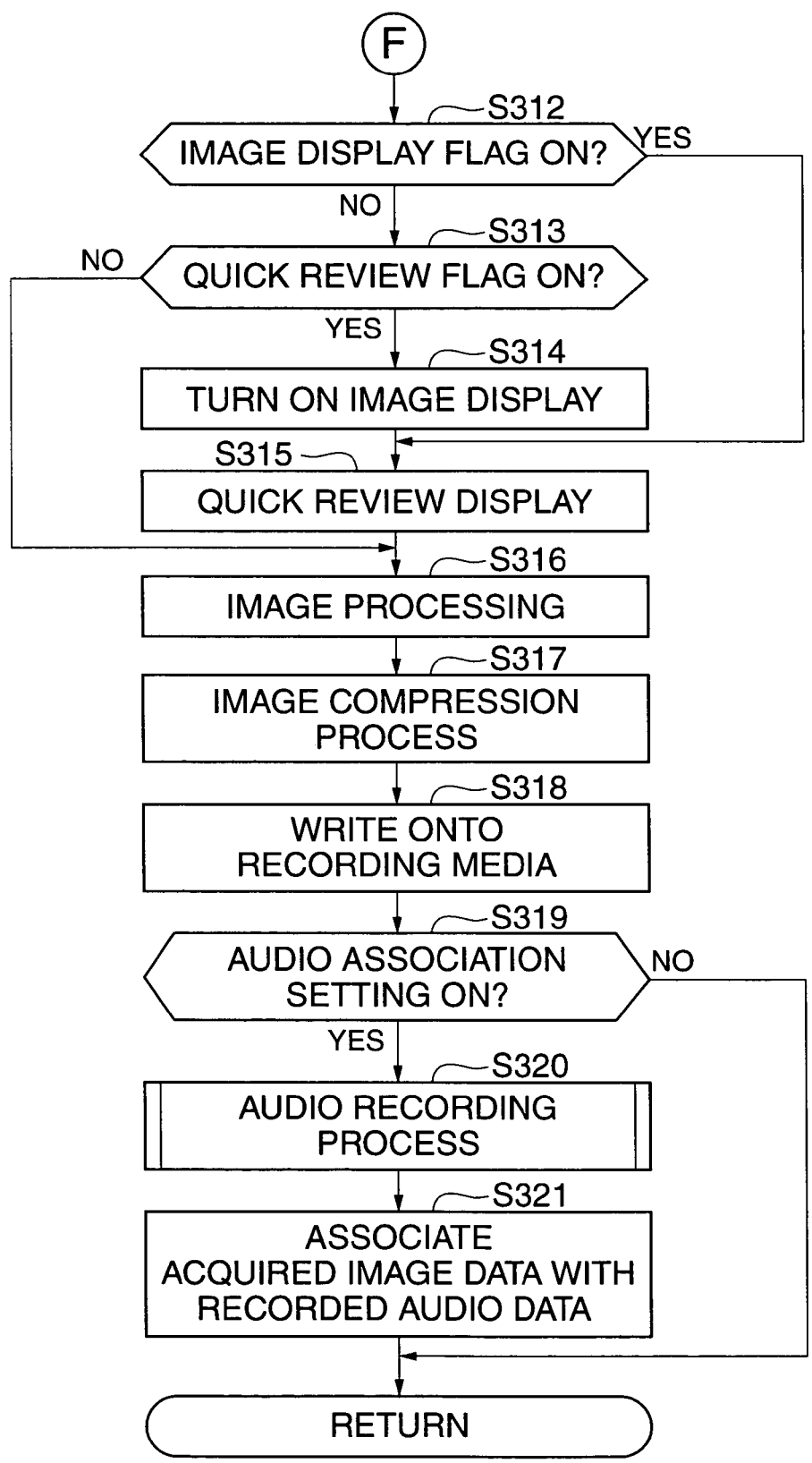
FIG. 8 is a flowchart showing a continued part of the flowchart of FIG. 7.

FIGS. 7 and 8 are flowcharts showing the procedure of a shooting process in a normal shooting mode in the step S38. When the system control circuit 50 determines that the normal shooting mode is selected as a result of checking the mode dial 60 (step S6 in FIG. 2), the present process is carried out.

First, the system control circuit 50 causes the exposure controller 40 to open the shutter 12 having the diaphragm function according to an aperture value based on the photometric data stored on the internal memory of the system control circuit 50 or on the memory 52, to expose the image pickup device 14 to light (steps S301 and S302).

It is determined whether or not flashing is necessary according to the on/off state of the flash flag (step S303). If it is determined that flashing is necessary, flashing is carried out (step S304). On the other hand, if it is determined that flashing is not necessary, flashing is not carried out, and the process proceeds to a step S305.

The system control circuit 50 waits until the exposure of the image pickup device 14 is completed, based on the photometric data (step S305). If the exposure is completed, the shutter 12 is closed (step S306), the charge signal is read out from the image pickup device 14, and shot image data are written onto the memory 30 via the A/D converter 16, the image processing circuit 20, and the memory control circuit 22, or via the memory control circuit 22 directly after A/d conversion by the A/D converter 16 (step S307).

Then, it is determined whether or not frame processing is necessary, according to the shooting mode presently set (step S308). If it is determined that the frame processing is not necessary, the process jumps to a step S311. On the other hand, if it is determined that the frame processing is necessary, the system control circuit 50 causes the image control circuit 22 and also the image processing circuit 20, if necessary, to read out the written image data from the memory 30, sequentially carry out vertical addition processing (step S309) and color processing (step S310), and then write the processed image data onto the memory 30. Further, the system control circuit 50 reads out the image data from the memory 30, and transfers the image data to the image display memory 24 via the memory control circuit 22 to display the same (step S311).

The system control circuit 50 determines the state of the image display flag stored on the internal memory of the system control circuit 50 or on the memory 52 (step S312). If it is determined that the image display flag is set, the quick review display is carried out (step S315). In this case, the image display device 28 always remains in the display state as the electronic finder during the shooting, and also carries out the quick review display immediately after the shooting.

On the other hand, if it is determined in the step S312 that the image display flag is reset, a determination is carried out as to the state of the quick review flag stored on the internal memory of the system control circuit 50 or on the memory 52 (step S313). If it is determined that the quick review flag is set, the image display of the image display device 28 is set ON (step S314), and the quick review display is carried out (step S315). On the other hand, if it is determined in the step S313 that the quick review flag is reset, the process proceeds to a step S316 with the image display device 28 remaining OFF. In this case, the image display device 28 remains OFF even after the shooting, and the quick review display is not carried out. This usage is applied when review of shot images is not necessary immediately after shooting, as in the case where shooting is continuously carried out using the optical finder 104, to thereby achieve saving of the electric power by turning off the electronic finder function of the image display device 28.

The system control circuit 50 reads out the written shot image data from the memory 30, and causes the memory control circuit 22 and also the image processing circuit 20, if necessary, to carry out various image processing (step S316), causes the compression/decompression circuit 32 to carry out an image compression processing according to the specified mode (step S317), and carries out a recording process to record the image data to the write buffer for the recording media 200 and 210 allocated to the memory 30 (step S318).

The system control circuit 50 determines a state of audio association setting stored on an internal memory of the system control circuit 50 or on the memory 52 (step S319). If it is set such that audio is associated with a shot image, an audio recording process is carried out (step S320). Then, the shot image data and the recorded audio data are associated with each other (a step S321). Then, the present process is terminated. Thus, by the association processing, the acquired image data and the recorded audio data are associated with each other. Details of the audio recording process in the step S320 will be described with reference to FIG. 11. If it is not set such that audio is associated with the shot image in the step S319, the present process is immediately terminated.

Figure 9:
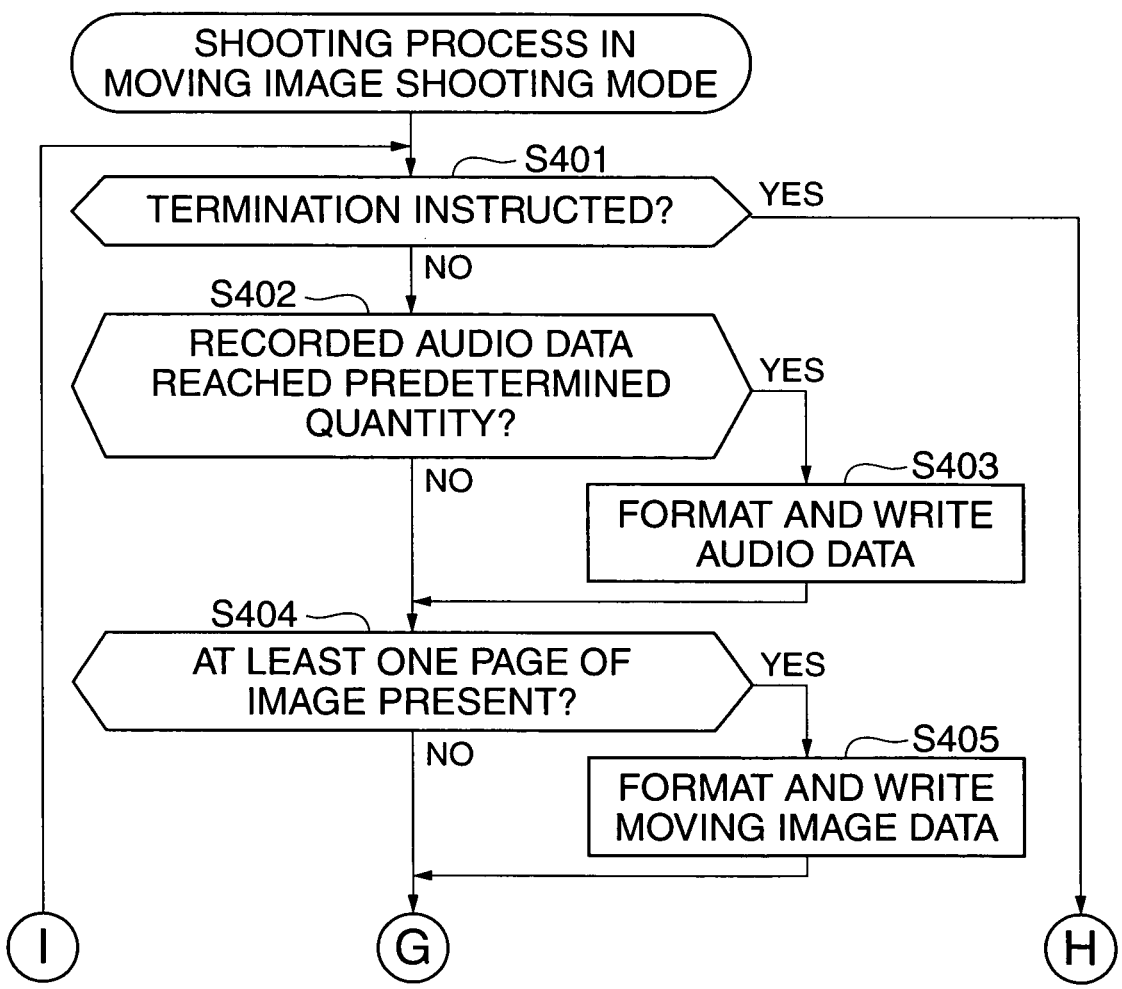
FIG. 9 is a flowchart showing the procedure of a shooting process in a moving image shooting mode in the step S38.
Figure 10:
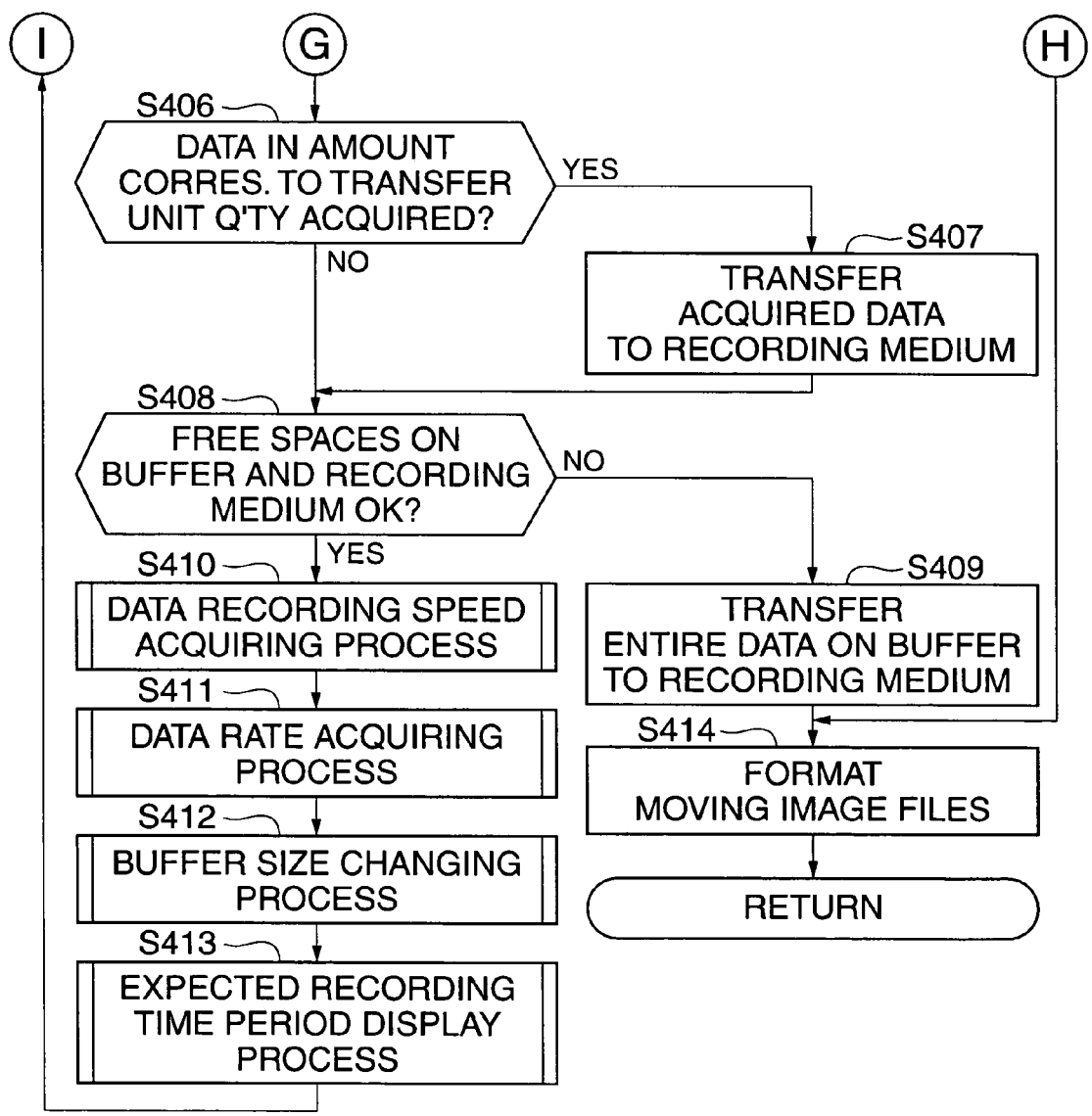
FIG. 10 is a flowchart showing a continued part of the flowchart of FIG. 9.

FIGS. 9 and 10 are flowcharts showing the procedure of a shooting process in the moving image shooting mode in the step S38. When the system control circuit 50 determines that the moving image shooting mode is selected as a result of checking the mode dial 60, the present process is carried out. First, it is determined whether or not the user instructs termination of moving image shooting, by operating the shutter switch 64 (step S401). If it is determined that the termination of the moving image shooting is instructed, the process proceeds to a step S414 to terminate the moving image shooting.

On the other hand, if it is determined that the termination of the moving image shooting is not instructed, audio data acquired via the microphone 114 and an A/D converter 116 are sequentially written onto the memory 30, and it is determined whether or not the audio data acquired by the sequence of audio data recording operations have reached a predetermined quantity (step S402). If it is determined that the audio data have not reached the predetermined quantity, the process jumps to a step S404. On the other hand, if it is determined that the audio data have reached the predetermined quantity, the system control circuit 50 formats the audio data into a predetermined moving image format, and writes the formatted audio data on a write buffer for a moving image file allocated to the memory 30 (step S403).

Then, it is determined whether or not there is at least one screen or page of image data which has been acquired by a sequence of moving image data shooting operations in which the compression/decompression circuit 32 sequentially compresses image data acquired via the image pickup device 14, the AD converter 16, the image processing circuit 20, and the memory control circuit 22, and then the image data is written onto the memory 30 (step S404). If it is determined that no screen or page of image data is present, the process jumps to a step S406. On the other hand, if it is determined that at least one screen or page of image data is present, the system control circuit 50 formats the image data into the predetermined moving image format, and writes the formatted moving image data onto the moving image file write buffer allocated to the memory 30 (step S405).

The system control circuit 50 determines whether or not an amount of moving image data corresponding to a predetermined transfer unit quantity has been acquired on the write buffer allocated to the memory 30 (step S406), and the process jumps to the step S408 if it is determined that the amount of moving image data corresponding to the predetermined transfer unit quantity has not been acquired. On the other hand, if it is determined that the amount of moving image data corresponding to the predetermined transfer unit quantity has been acquired, the acquired data which has reached the predetermined quantity is transferred to the recording medium 200 or 210 (step S407), and the process proceeds to the step S408. The system control circuit 50 checks the free space of the write buffer allocated to the memory 30, and the free space of the recording medium 200 or 210 during recording, and determines whether or not the free spaces are not less than respective corresponding predetermined quantities (step S408). If as a result of the checking, it is determined that either the free space of the write buffer or the free space of the recording medium 200 or 210 is less than the corresponding predetermined quantity, the corresponding entire moving image data remaining in the buffer is transferred to the recording medium 200 or 210 during recording (step S409).

Thereafter, the system control circuit 50 writes values which can be updated only after shooting (such as a total shooting time period, a total frame number, and an index area) on a moving image file, and formats the moving image file (step S414), and the process returns to the main process.

On the other hand, if it is determined in the step S408 that both of the free spaces of the write buffer and the recording medium 200 or 210 are not less than the respective predetermined quantities, a data recording speed is acquired by the data recording speed acquiring process (step S410), and a data rate of the moving image data is acquired by a data rate acquiring process (step S411).

Then, the buffer size changing process is carried out to change the size of the write buffer according to an expected driving time period obtained based on the residual capacity of the battery and the data recording speed (step S412), and the expected recording time period display process is carried out to display an expected recording time period based on the acquired data recording speeds and the move data rate (step S413). Then, the process returns to the step S401. The data recording speed acquiring process, the data rate acquiring process, the buffer size changing process, and the expected recording time period display process will be described in detail later.

Figure 11:
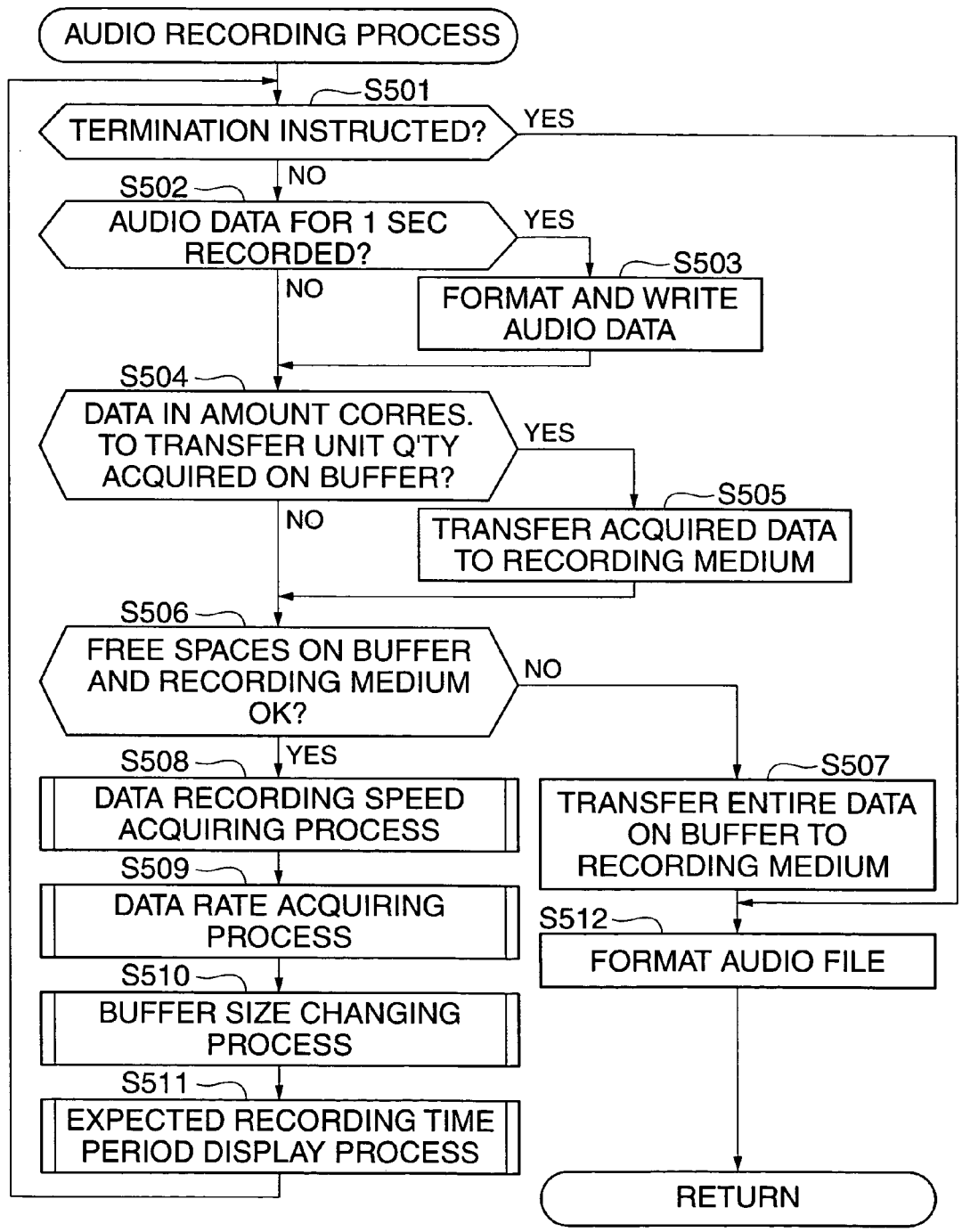
FIG. 11 is a flowchart showing the procedure of an audio recording process in an audio recording mode in the step S38.

FIG. 11 is a flowchart showing the procedure of the audio recording process in the audio recording mode in the step S38. When the system control circuit 50 determines that the audio recording mode is selected as a result of checking the mode dial 60 (step S6 in FIG. 2), the present process is carried out.

First, the system control circuit 50 determines whether or not the user instructs termination of audio recording, by operating the shutter switch 64 (step S501). If it is determined that the termination of audio recording is instructed, the process proceeds to a step S512 to carry out terminating processing of audio recording.

On the other hand, if it is determined in the step S501 that the termination of audio recording is not instructed, it is determined whether or not audio data acquired by a sequence of audio data recording operations in which audio data acquired via the microphone 114 and the A/D converter 116 are sequentially written onto the memory 30 have reached a predetermined quantity (one second, for example) (step S502). If it is determined that the audio data have reached the predetermined quantity, the audio data are formatted into a predetermined audio format, the formatted audio data are written onto a write buffer for an audio file allocated to the memory 30 (step S503), and the process proceeds to a step S504. On the other hand, if it is determined in the step S502 that the audio data have not reached the predetermined quantity, the process jumps to the step S504.

Then, the system control circuit 50 determines whether or not an amount of audio data corresponding to a predetermined transfer unit quantity has been acquired on the write buffer allocated to the memory 30 (step S504). If it is determined that the amount of audio data corresponding to the predetermined transfer unit quantity the predetermined transfer unit quantity has been acquired, the acquired amount of audio data corresponding to the transfer unit quantity is transferred to the recording medium 200 and 210 (step S505), and the process proceeds to a step S506. On the other hand, if it is determined that the amount of audio data corresponding to the predetermined transfer unit quantity has not been acquired, the procedure jumps to the step S506.

Then, the system control circuit 50 checks the free space of the write buffer allocated to the memory 30, and the free space of the recording medium 200 or 210 during recording, and determines whether or not the free spaces are not less than respective corresponding predetermined quantities (step S506). If as a result of the checking, it is determined that either the free space the write buffer or the free space of the recording medium 200 or 210 is less than the corresponding predetermined quantity, the corresponding entire audio data remaining in the buffer is transferred to the recording medium 200 or 210 during recording (step S507).

Then, values which can be updated only after shooting (such as a total recording time period) are written onto an audio file, and the audio file is formatted (step S512), and the process returns to the main process.

On the other hand, if it is determined in the step S506 that both of the free spaces of the write buffer and the recording medium 200 or 210 are not less than the respective predetermined quantities, a data recording speed is acquired by the data recording speed acquiring process (step S508), and the data rate of the acquired audio data is acquired by the data rate (audio data rate) acquiring process (step S509).

Then, the buffer size changing process is carried out to change the size of the write buffer according to the expected driving time period obtained based on the residual capacity of the battery, and the data recording speed (step S510), and the expected recording time period display process is carried out to show an expected recording time period based on the acquired data recording speed and the audio data rate (step S511). The data recording speed acquiring process, the audio data rate acquiring process, the write buffer size changing process, and the expected recording time period display process will be described in detail later. Then, the process returns to the step S501.

Figure 12:
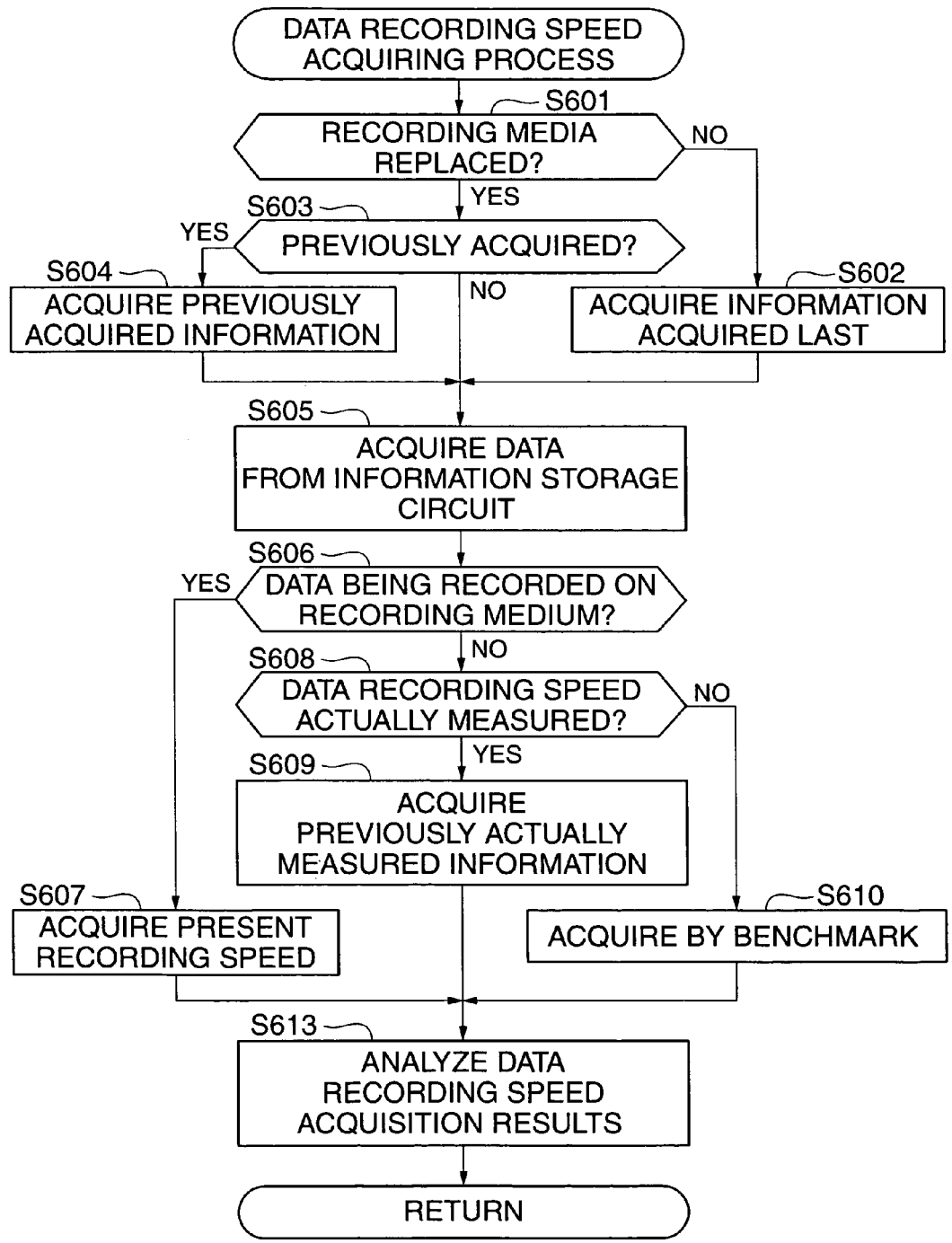
FIG. 12 is a flowchart showing the procedure of a data recording speed acquiring process in steps S3, S11, S410, and S508.

FIG. 12 is a flowchart showing the procedure of the data recording speed acquiring process in the steps S3, S11, S410, and S508. The system control circuit 50 checks the interfaces 90 and 94 to detect whether or not the recording media 200 and 210 have been replaced (step S601). If it is detected that the recording media 200 and 210 have not been replaced, data recording speed information acquired last is acquired (step S602). Then, the process proceeds to a step S605.

On the other hand, if it is detected that at least one of the recording media 200 and 210 has been replaced, the system control circuit 50 checks an information recording circuit inside the replaced recording medium 200 or 210 (step S603), and if the data recording speed of the replaced recording medium 200 or 210 has been previously acquired, the previously acquired data recording speed information is acquired (step S604). Then, the process proceeds to the step S605. On the other hand, if the data recording speed of the replaced recording medium 200 or 210 has not been previously acquired, the process jumps to the step S605. Then, the system control circuit 50 checks the information recording circuit inside the recording medium 200 or 210, and acquires data recording speed information from a part of the circuit where the specifications are stored (step S605).

The system control circuit 50 determines whether or not data is being recorded onto the recording medium 200 or 210 (step S606). If it is determined that data is being recorded, the timer 58 is caused to measure the lapse of a unit time period, to measure the data recording speed from an amount of data recorded within the unit time period (step S607). Then, the process proceeds to a step S613. The step S607 may be modified such that the timer 58 is caused to measure a time period required to record a predetermined quantity of data, to thereby obtain a data recording speed from the required time period.

On the other hand, if it is determined in the step S606 that no data is being recorded, the system control circuit 50 determines whether or not the data recording speed of the recording medium 200 presently connected to the interface 90 or the recording medium 210 presently connected to the interface 94 has been actually measured in the past (step S608). If it is determined that the data recording speed has been actually measured in the past, the previously measured data recording speed information is acquired (step S609). Then, the process proceeds to the step S613.

On the other hand, if it is determined in the step S608 that the data recording speed has never been actually measured in the past, a benchmark test is carried out by causing the timer 58 to measure a time period required for writing a predetermined quantity of reference data onto the checked recording medium 200 or 210, thereby acquiring data recording speeds (step S610). Then, the process proceeds to the step S613. Then, the system control circuit 50 analyzes results of the acquisition of the data recording speeds so that the slowest data recording speed of the acquired data recording speeds is set to the data recording speed of the checked recording medium 200 or 210 (step S613). Then, the process returns to the main process.

Figure 13:
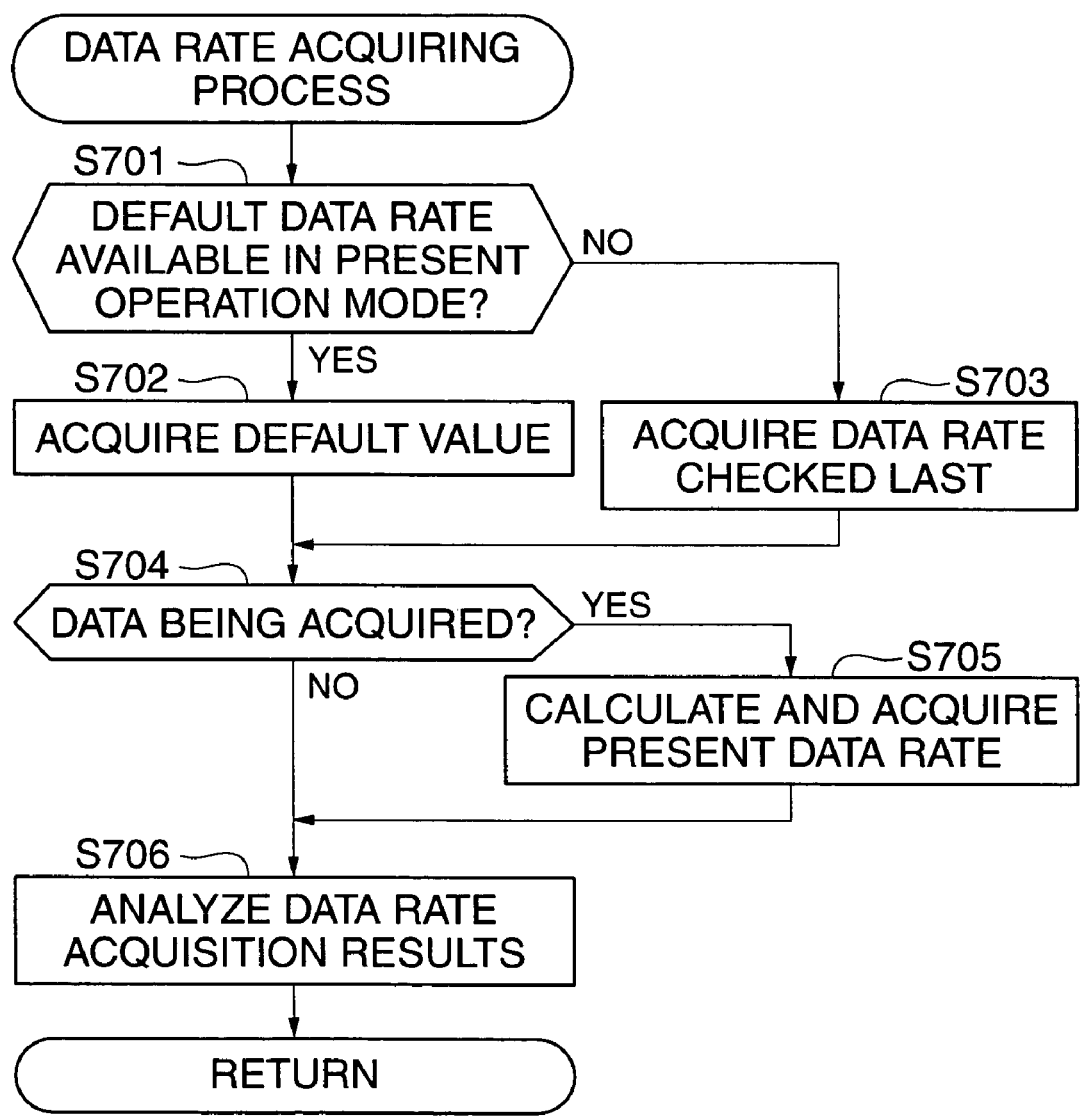
FIG. 13 is a flowchart showing the procedure of a data rate acquiring process in steps S12, S411, and S509.

FIG. 13 is a flowchart showing the procedure of the data rate acquiring process in the steps S12, S411, and S509. The system control circuit 50 checks the mode dial 60 and the non-volatile memory 56 to determine whether or not a default value of the data rate is available in the present operation mode (step S701). If it is determined that the default value is prepared, the default value is acquired as the data rate in the present operation mode (step S702). On the other hand, if it is determined that the default value is not available, a data rate checked last time is acquired as the data rate in the present operation mode (step S703).

Then, the system control circuit 50 determines whether or not data is being acquired onto the write buffer allocated to the memory 30 (step S704). If it is determined that data is being acquired, the timer 58 is caused to measure a unit time period, to thereby measure the data rate from the quantity of data acquired within the unit time period (step S705). Then, the process proceeds to a step. S706. The step S705 may be modified such that the timer 58 is caused to measure a time period required to acquire a predetermined quantity of data to thereby obtain the data rate from the measured time period. On the other hand, if it is determined in the step S704 that no data is being acquired on the write buffer, the process jumps to the step S706. Then, the system control circuit 50 analyzes results of the acquisition of the data rates so that the highest data rate of the detected acquired data rates is set to the data rate (step S706). Then, the process returns to the main process.

Figure 14:
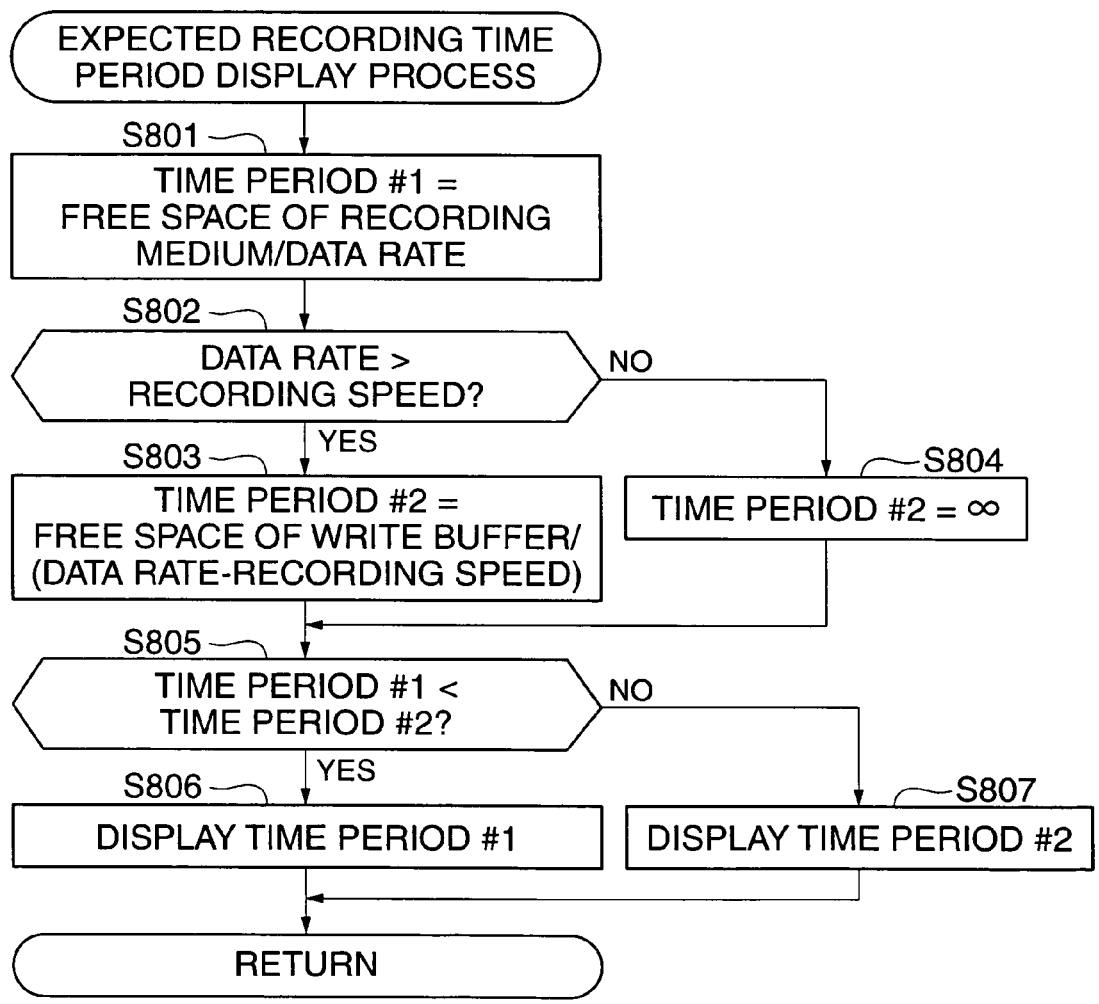
FIG. 14 is a flowchart showing the procedure of a recording-enable time period display process in steps S13, S413, and S511.

FIG. 14 is a flowchart showing the procedure of the expected recording time period display process in the steps S13, S413, and S511. The system control circuit 50 calculates an expected recording time period #1 according to the following equation (1) based on the free space of the recording medium 200 or 210, and the data rate acquired by the data rate acquiring process in FIG. 13 (step S801).

$$\text{Expected recording time period\#1} = \text{Free space of recording medium/data rate} \quad (1)$$

Then, the system control circuit 50 compares the data recording speed acquired by the data recording speed acquiring process in FIG. 12 and the data rate acquired by the data rate acquiring process in FIG. 13, to thereby determine whether or not the data rate is larger than the data recording speed (step S802). If it is determined that the data rate is not more than the data recording speed, an expected recording time period #2 is set to ∞ (step S804), and the process proceeds to a step S805.

On the other hand, if it is determined in the step S802 that the data rate is more than the data recording speed, the system control circuit 50 calculates the expected recording time period #2 according to the following equation (2) based on the data recording speed acquired by the process of FIG. 12, the data rate acquired by the process of FIG. 13, and the free space of the write buffer of the memory 30 (step S803), and the process proceeds to the step S805.

$$\text{Expected recording time period\#2} = \text{Free space of write buffer/(Data rate} - \text{Recording speed)} \quad (2)$$

Figure 15:
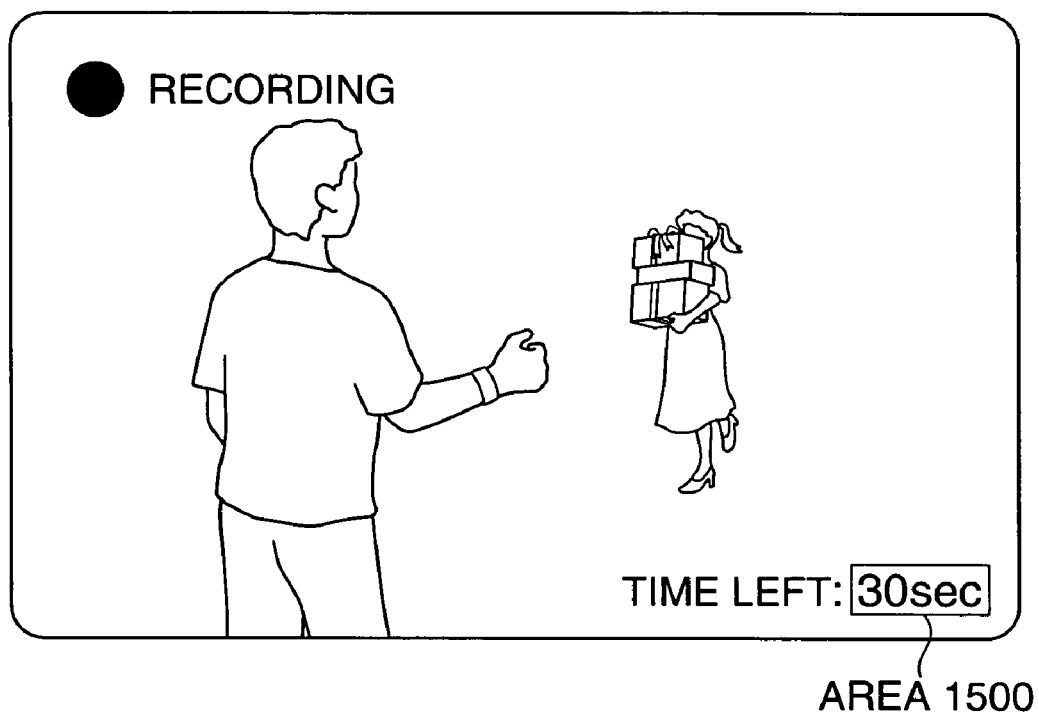
FIG. 15 shows an expected recording time period displayed on a screen of an image display device 28 or a display device 54 in steps S806 and S807.

The system control circuit 50 compares the expected recording time periods #1 and #2 with each other, and determines whether or not the expected recording time period #1 is less than the expected recording time period #2 (step S805). If it is determined that the expected recording time period #1 is less than the corresponding expected recording time period #2, the expected recording time period #1 is displayed on the image display device 28 or an area 1500 in FIG. 15 of the liquid crystal display device 54 (step S806). Then, the process returns to the main process. On the other hand, if it is determined that the expected recording time period(s) #1 is not less than the corresponding expected recording time period #2, the expected recording time period #2 is displayed on the image display device 28 or the area 1500 in FIG. 15 of the liquid crystal display device 54 (step S806). Then, the process returns to the main process.

Figure 16:
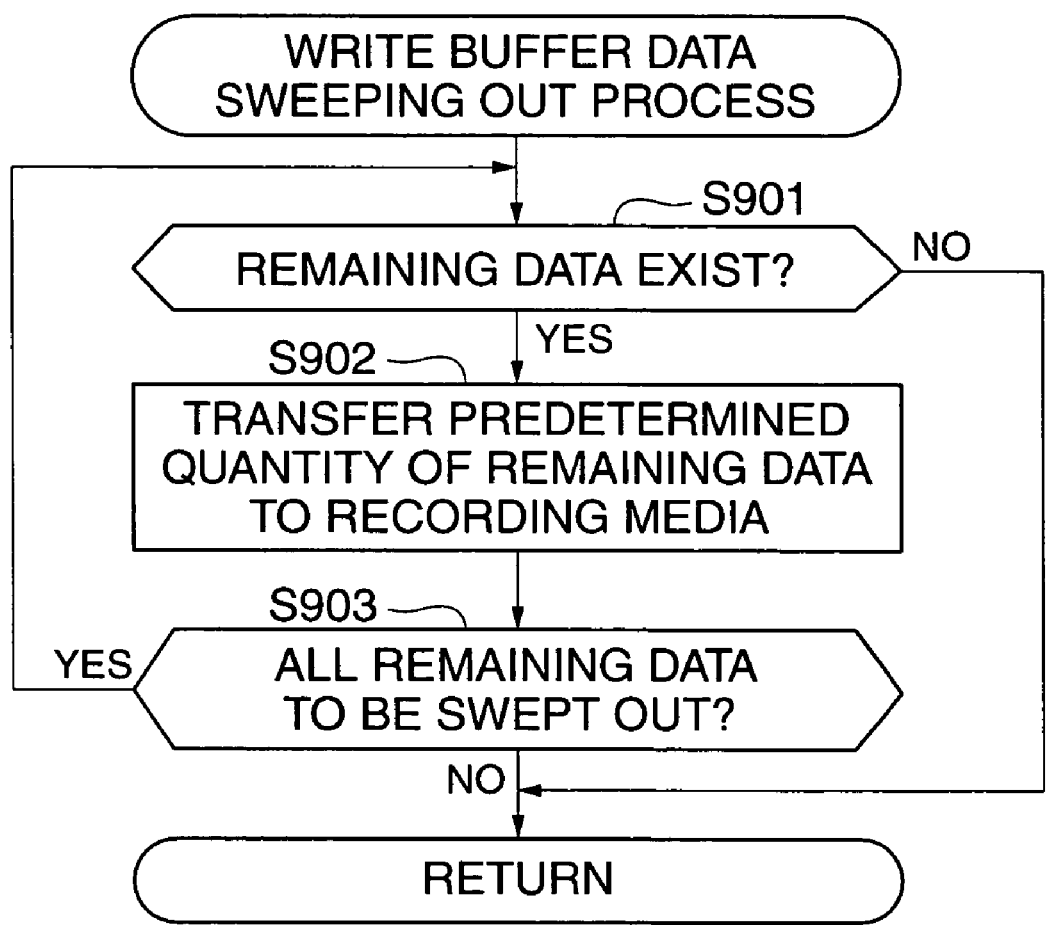
FIG. 16 is a flowchart showing the procedure of a process reading data in a write buffer of a memory onto recording media 200 and 210 in steps S4, S7, and S9.

FIG. 16 is a flowchart showing the procedure of the write buffer data sweeping out process in the steps S4, S7, and S9. The system control circuit 50 determines whether or not there remain data which have not transferred yet on the write buffer of the memory 30 (step S901). If it is determined that there remains no data which has not been transferred yet, writing onto the recording media 200 and 210 is terminated, and the process returns to the main process. On the other hand, if it is determined that there remain data which have not transferred yet, a predetermined quantity of the remaining data is transferred to the recording media 200 and 210 (step S902). Then, the system control circuit 50 determines whether or not all the remaining data is to be swept out by the sweeping out process in the steps S7 or S9 (step S903). If it is determined that all the remaining data is to be swept out by the sweeping out process, the process returns to the step S901. On the other hand, if it is determined that all the remaining data is not to be swept out by the sweeping out process, writing onto the recording media 200 and 210 is terminated, and the process returns to the main process.

Figure 17:
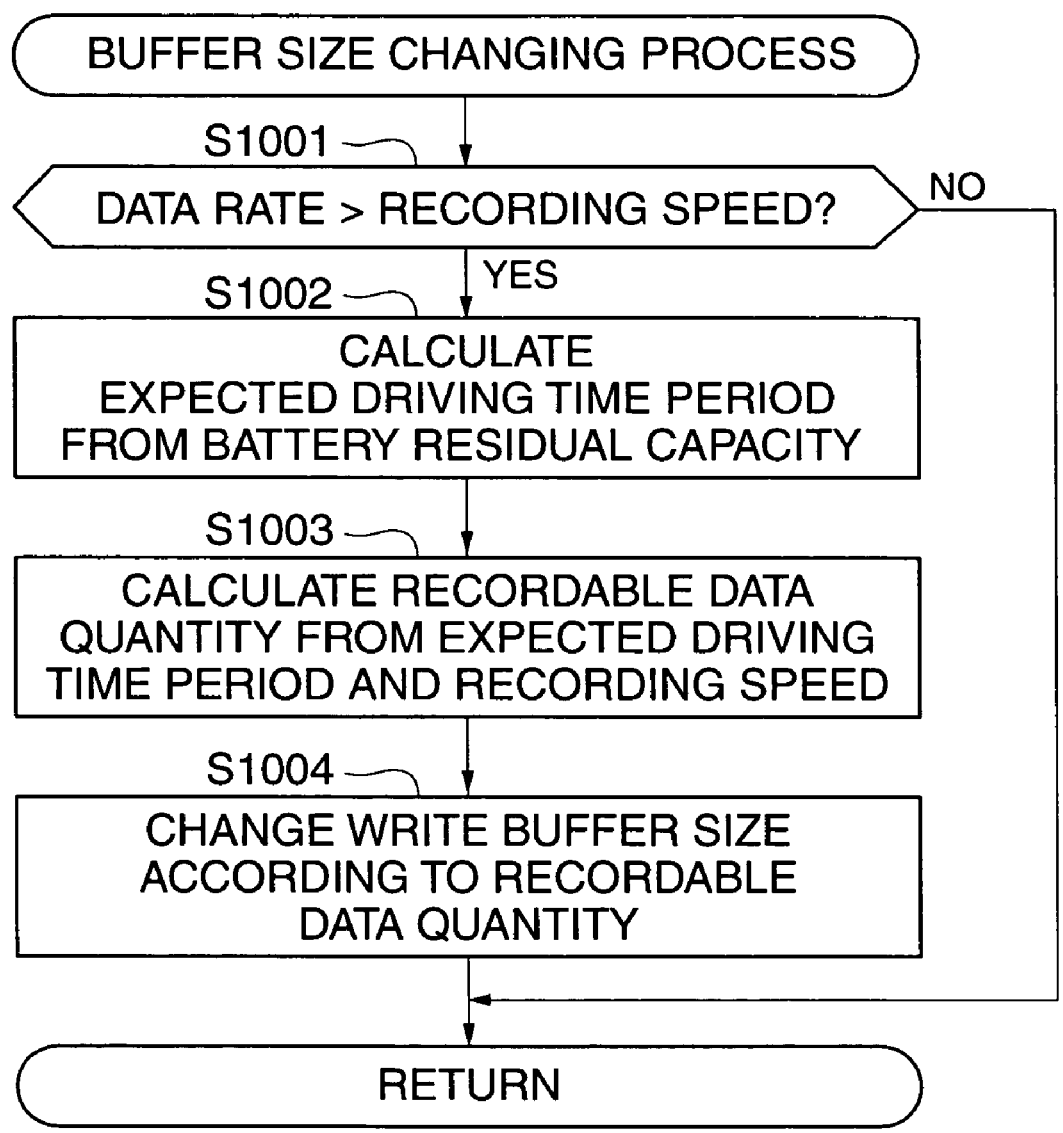
FIG. 17 is a flowchart showing the procedure of a buffer size changing process in steps S5, S412, and S510.

FIG. 17 is a flowchart showing the procedure of the buffer size changing process in the steps S5, S412, and S510.

The system control circuit 50 first compares the data rate of moving image data or audio data to be recorded and the data recording speed of the recording medium with each other (step S1001). If the data recording speed is higher, the data will not be stored on the memory 30, so that there remains no data on the memory 30 when the battery becomes empty. Therefore, the process is immediately terminated without changing the write buffer size.

On the other hand, if the data rate is higher than the recording speed, the power supply controller 80 is caused to acquire the residual capacity of the battery, and then the expected driving time period is calculated based on the acquired residual capacity of the battery (step S1002).

Further, the system control circuit 50 calculates a recordable data quantity before the residual capacity of the battery becomes "0 (zero)" based on the acquired expected driving time period and the data recording speed of the recording medium acquired by the process of FIG. 12 (step S1003). Then, the system control circuit 50 changes the size of the write buffer for the recording media 200 and 210 on the memory 30 based on the acquired recordable data quantity (step S1004).

At this time, the write buffer size is calculated according to the following equation:

$$\text{Recordable data quantity} - (\text{Recordable data quantity} \times (\text{Recording speed/Data rate}))$$

Namely, if the data rate is higher than the recording speed, data in a quantity per unit time period corresponding to the difference between the data rate and the recording speed is stored on the memory 30. Thus, at a time point moving image data in a quantity corresponding to the recordable data quantity has been acquired, the quantity of data which has already been written from the memory 30 to the recording medium is as follows:

$$\text{Recordable data quantity} \times (\text{Recording speed/Data rate})$$

Namely, at this time point, the quantity of data which has not been written onto the recording media 200, 210 and thus, remains on the memory 30 is as follows:

$$\text{Recordable data quantity} - (\text{Recordable data quantity} \times (\text{Recording speed/Data rate}))$$

As described above, the electronic camera according to the present embodiment can carry out data acquisition and recording according to the residual capacity of the battery when the residual capacity is small.

It should be understood that the present invention is not limited to the embodiment described above, but various variations of the above described embodiment may be possible without departing from the spirits of the present invention.

For example, although in the above described embodiment, the data to be acquired include still images, moving image images, and audio, the types of the data are not limited. Although in the above described embodiment, the recording media 200 and 210 include the information storage circuit which stores the specifications in the respective non-volatile memories thereof, the respective recording speeds are acquired by other means, and thus no problem will arise even if the information storage circuit is not provided.

Further, although in the above described embodiment, the data recording speed is acquired using a plurality of methods, some of the methods may not be employed. In addition, it is not always necessary to detect the data recording speed at the start of the camera, and the data recording speed may be detected when the load on the data recording apparatus is lower than in a predetermined state (for example, the writing operation is not carried out at all), or the data recording speed may be acquired when the data recording is being carried out.

Moreover, although according to the above described data rate acquiring process, the data rate is acquired using a plurality of methods, some of the methods may not be employed. In addition, the expected recording time period is displayed both before and during the recording, it may be displayed only either before or during recording. Although the expected recording time period is superimposed on the display of the electronic finder, only the expected recording time period may be displayed.

Further, although the write buffer size is changed so as to prevent data from being stored on the write buffer in a quantity exceeding the recordable data quantity until the residual capacity of the battery becomes "0", instead of changing the write buffer size itself, the data quantity to be stored on the write buffer and/or the quantity of data (size) in the image data file and/or the audio data file to be recorded may be restricted.

A description will now be given of the shooting process in the moving image shooting mode in the step S38, which is applied to this alternative method.

Figure 18B:
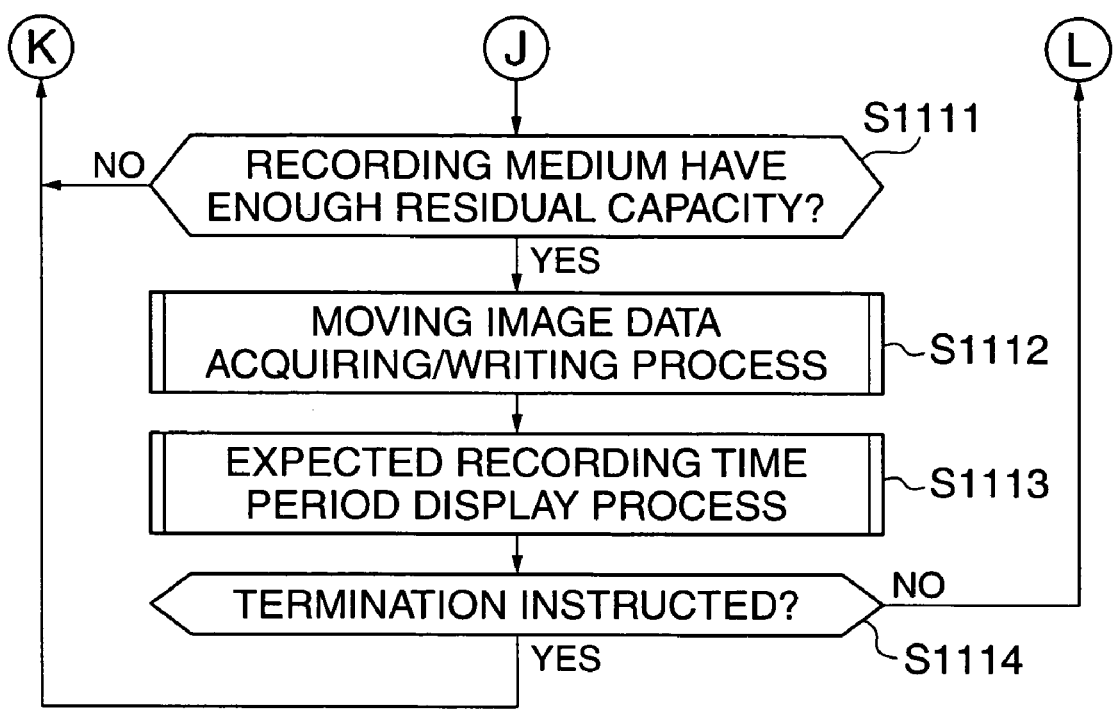

FIGS. 18A and 18B are flowchart showing the procedure of the shooting process in the moving image shooting mode in the step S38.

Figure 19:
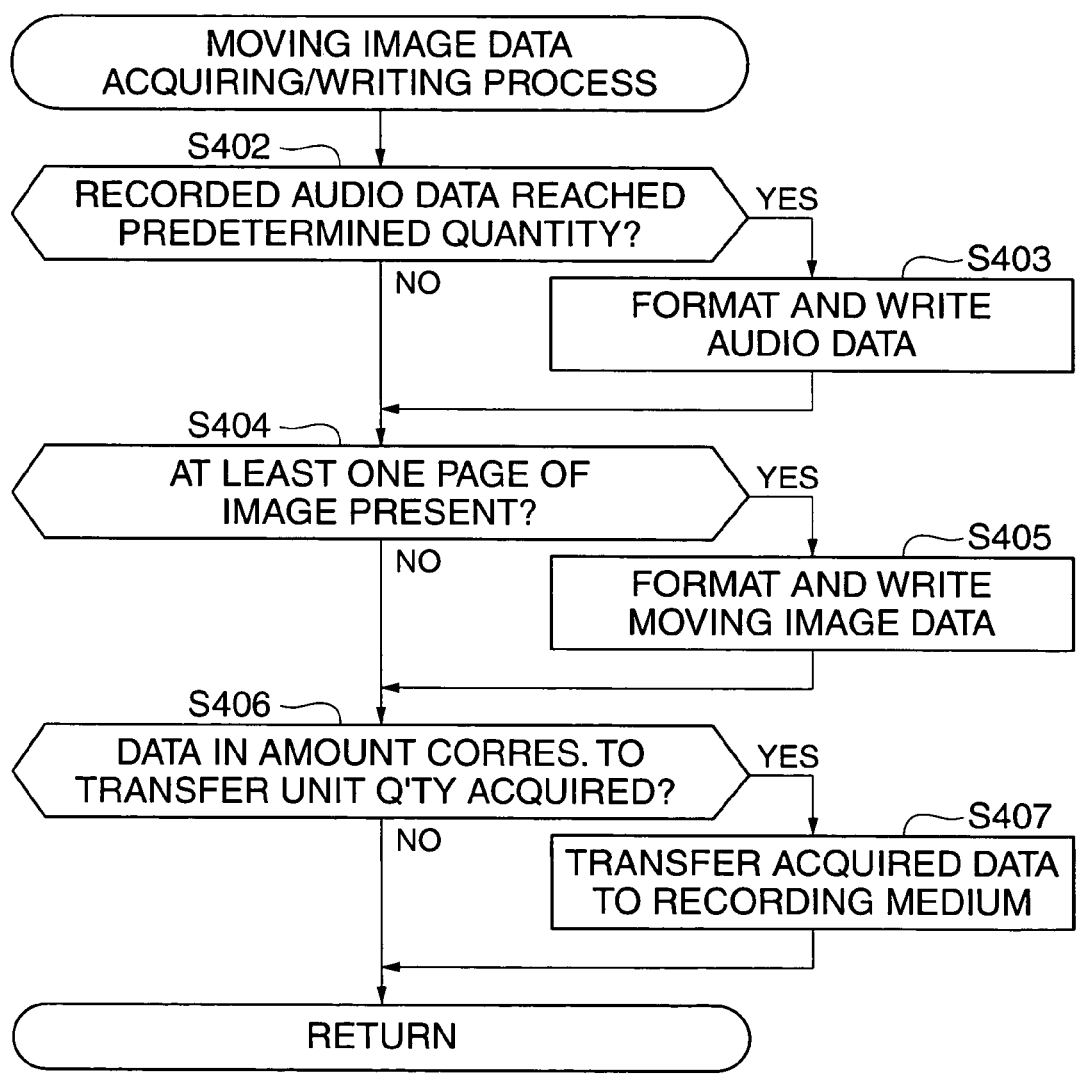
FIG. 19 is a flowchart showing the procedure of a moving image data acquiring/writing process in a step S1112.

In FIG. 18A, first, it is determined whether or not the residual capacity of the battery is not more than a predetermined capacity (step S1101). If it is determined that the residual capacity of the battery is more than the predetermined capacity, it is determined whether or not the recording medium 200 or 210 has an enough residual capacity (S1111). If it is determined that the recording medium has an enough residual capacity, a process for acquiring and writing moving image data, shown in FIG. 19, is carried out (step S1112). The process for acquiring and writing moving image data in FIG. 19 is similar to the steps S402 through S407 in FIGS. 9 and 10, and thus corresponding steps are designated by identical reference numerals, and description thereof is omitted.

Referring again to FIG. 18B, the expected recording time period display process in FIG. 14 is carried out (step S1113), and it is determined whether or not termination of the recording is instructed (step S1114). If it is determined that the termination is instructed, the process proceeds to a step S1109, and otherwise the process returns to the step S1101.

In this way, when the residual capacity of the battery is higher than the predetermined capacity, the normal recording process is continued.

On the other hand, if it is determined in the step S1101 that the residual capacity of the battery decreases to the predetermined capacity during shooting, the expected driving time period is detected based on the residual capacity of the battery (step S1102), and further the recordable data quantity is calculated based on the expected driving time period and the recording speed (step S1103). Then, it is determined whether or not the recording medium 200 or 210 has a residual capacity more than a predetermined capacity (step S1104). If it is determined that the recording medium 200 or 210 has a residual capacity more than the predetermined capacity, the process for acquiring and writing moving image data in FIG. 19 is carried out (step S1105), and the expected recording time period display process in FIG. 14 is carried out (step S1106).

Then, it is determined whether or not moving image data has been acquired, namely written onto the memory 30 in a quantity corresponding to the recordable data quantity calculated in the step S1103 (step S1107). If it is determined that moving image data in the recordable data quantity has been acquired, writing of new moving image data onto the memory 30 is terminated, the entire moving image data stored on the memory 30 is written onto the recording medium (step S1109), the moving image data file is formatted (step S1110), followed by the process being terminated. On the other hand, if it is determined in the step S1107 that moving image data in the recordable data quantity has not been acquired, it is determined whether or not termination of the recording is instructed (step S1108). If it is determined that the termination is instructed, the process proceeds to the step S1109, and otherwise the process returns to the step S1104.

On the other hand, if it is determined in the steps S1104 and S1111 that the recording medium has no residual capacity, or if it is determined in the step S1114 that the termination is instructed, the process proceeds to the step S1109.

In this way, the recordable data quantity is calculated based on the residual capacity of the battery and the recording speed of the recording medium, and the acquisition of the moving image data is inhibited when the moving image data in the recordable data quantity has been acquired. As a result, even if the expected driving time period becomes short, data can be recorded in a quantity as large as possible according to the recording speed of the recording medium.

The recording media 200 and 210 may be not only a memory card such as a PCMCIA card and a compact flash (registered trademark), a hard disk, and the like but also a micro-DAT, an optical magnetic disk, an optical disk such as CD-R and CD-RW, a phase-change optical disk such as DVD, and the like. Further, the recording media 200 and 210 may be composite media comprised of a memory card and a hard disk or the like contained in one body. Still further, the composite medium may be a type in which a part of the medium is detachable.

Although in the above described embodiment, the recording media 200 and 210 are prepared separately from the image processing apparatus 100 and can be connected to the image processing apparatus 100 as required, either or both of the recording media 200 and 210 may be fixed to the image processing apparatus 100. In addition, a single or an arbitrary number of recording media 200 and 210 may be connected to the image processing apparatus 100. It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the novel functions of the above described embodiment, and hence the program code and a storage medium on which the program code is stored constitute the present invention.

Further, examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A data recording apparatus comprising:
   a memory;
   a controller that carries out a recording operation of temporarily writing acquired information data onto said memory, and thereafter transferring the information data to at least one recording medium to record the information data;
   a data recording speed detecting device that detects a data recording speed at which the information data is recorded on the recording medium;
   a power-supply remaining quantity detecting device that detects a remaining quantity of a power supply for supplying power to the data recording apparatus;
   an expected driving time period detecting device that detects an expected driving time period for which the data recording apparatus can be driven, based on the detected remaining quantity of said power supply;
   a recordable data quantity calculating device that calculates a quantity of data recordable on the recording medium based on the detected data recording speed and the detected expected driving time period; and
   a data size changing device that changes a size of data to be written onto said memory based on the detected recordable quantity of data.

2. A data recording apparatus as claimed in claim 1, comprising an acquired data quantity detecting device that detects a quantity of the acquired information data, and a restriction device that restricts the recording operation of the data recording apparatus when the detected quantity of the acquired information data is larger than the changed size of data to be written onto said memory.

3. A data recording apparatus as claimed in claim 1, wherein said data recording speed detecting device acquires information relating to the data recording speed from information on specifications recorded on the recording medium and detects the data recording speed based on the acquired information relating to the data recording speed.

4. A data recording apparatus as claimed in claim 1, wherein said data recording speed detecting device comprises a writing device that writes a predetermined quantity of reference data onto the recording medium, and a timer that measures a time period required for writing the predetermined quantity of reference data onto the recording medium, and said data recording speed detecting device calculates the data recording speed based on the predetermined quantity of reference data and the measured time period.

5. A data recording apparatus as claimed in claim 1, wherein said controller causes said data recording speed detecting device to be operated immediately after start of the data recording apparatus.

6. A data recording apparatus as claimed in claim 1, wherein said controller causes said data recording speed detecting device to be operated after recognition of said recording medium.

7. A data recording apparatus as claimed in claim 1, wherein said controller causes said data recording speed detecting device to be operated when a load on the data recording apparatus is less than a load in a predetermined state.

8. A data recording apparatus as claimed in claim 1, wherein said data recording speed detecting device comprises a storage circuit that stores speed information indicative of the data recording speed, and said data recording speed detecting device detects the data recording speed based on the speed information stored on said storage circuit.

9. A data recording apparatus as claimed in claim 8, wherein said data recording speed detecting device stores the speed information indicative of data recording speeds of a plurality of recording media in association with the plurality of recording media, and when the recording medium is one of the plurality of recording media, said data recording speed detecting device reads out the speed information corresponding to the recording medium from said storage circuit, and detects the data recording speed based on the read-out speed information.

10. A data recording apparatus as claimed in claim 1, comprising an image pickup device that picks up a subject to obtain moving image data and outputs the moving image data, and wherein the moving image data obtained by said image pickup device is acquired as the information data.

11. A data recording apparatus as claimed in claim 1, further comprising an image pickup device that converts an optical signal into the acquired information data.

12. A data recording apparatus for recording information data on a recording medium, comprising
   a data recording speed detecting device that detects a data recording speed at which the information data is recorded on the recording medium;
   a power-supply remaining quantity detecting device that detects a remaining quantity of a power supply for supplying power to the data recording apparatus;
   an expected driving time period detecting device that detects an expected driving time period for which the data recording apparatus can be driven, based on the detected remaining quantity of the power supply;
   a recordable data quantity calculating device that calculates a quantity of data recordable on the recording medium based on the detected data recording speed and the detected expected driving time period; and
   a data size changing device that changes a quantity of the information data to be recorded on the recording medium based on the detected recordable quantity of data.

13. A data recording apparatus as claimed in claim 12, further comprising an image pickup device that converts an optical signal into the information data.

14. A data recording method of causing a data recording apparatus to record acquired information data by temporarily writing acquired information data onto a memory, and thereafter transferring the information data to at least one recording medium, comprising:
   a data recording speed detecting step of detecting a data recording speed at which the information data is recorded on the recording medium;
   a power-supply remaining quantity detecting step of detecting a remaining quantity of a power supply for supplying power to the data recording apparatus;
   an expected driving time period detecting step of detecting an expected driving time period for which the data recording apparatus can be driven, based on the detected remaining quantity of the power supply;

a recordable data quantity calculating step of calculating a quantity of data recordable on the recording medium based on the detected data recording speed and the detected expected driving time period; and a data size changing step of changing a size of data to be written onto the memory based on the detected recordable quantity of data.

15. A data recording method of causing a data recording apparatus to record information on a recording medium, comprising:

a data recording speed detecting step of detecting a data recording speed at which the information data is recorded on the recording medium;

a power-supply remaining quantity detecting step of detecting a remaining quantity of a power supply for supplying power to the data recording apparatus;

an expected driving time period detecting step of detecting an expected driving time period for which the data recording apparatus can be driven, based on the detected remaining quantity of the power supply;

a recordable data quantity calculating step of calculating a quantity of data recordable on the recording medium based on the detected data recording speed and the detected expected driving time period; and a data size changing step of changing a quantity of the information data to be recorded on the recording medium based on the detected recordable quantity of data.

* * * * *